(12) United States Patent
Faulkner et al.

(10) Patent No.: US 7,743,064 B2
(45) Date of Patent: *Jun. 22, 2010

(54) MEDIA ASSET MANAGEMENT SYSTEM FOR MANAGING VIDEO SEGMENTS FROM FIXED-AREA SECURITY CAMERAS AND ASSOCIATED METHODS

(75) Inventors: Gary J. Faulkner, Melbourne, FL (US); Kevin L. Fox, Palm Bay, FL (US); Tahia Infantes Morris, Seabrook, TX (US); Eric D. Wilson, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 589 days.

This patent is subject to a terminal disclaimer.

(21) Appl. No.: 10/834,728

(22) Filed: Apr. 29, 2004

(65) Prior Publication Data

US 2005/0246373 A1 Nov. 3, 2005

(51) Int. Cl.
G06F 7/00 (2006.01)
(52) U.S. Cl. .................. 707/758; 707/705; 707/706; 707/749; 707/763
(58) Field of Classification Search ............ 707/2, 707/3, 4, 10, 100, 1, 104.1
See application file for complete search history.

(56) References Cited

U.S. PATENT DOCUMENTS

| | | | |
|---|---|---|---|
| 5,649,032 A * | 7/1997 | Burt et al. .............. | 382/284 |
| 5,873,056 A | 2/1999 | Liddy et al. ............ | 704/9 |
| 5,898,680 A | 4/1999 | Johnstone et al. ....... | 370/316 |
| 6,173,287 B1 | 1/2001 | Eberman et al. ......... | 707/102 |
| 6,195,122 B1 | 2/2001 | Vincent .................. | 348/169 |
| 6,253,239 B1 | 6/2001 | Shklar et al. ........... | 709/217 |
| 6,272,457 B1 | 8/2001 | Ford et al. .............. | 704/9 |
| 6,282,362 B1 | 8/2001 | Murphy et al. .......... | 386/46 |

(Continued)

FOREIGN PATENT DOCUMENTS

EP 0838663 4/1998

(Continued)

OTHER PUBLICATIONS

Khan et al., "Retrieval Effectiveness of an Ontology-Based Model for Information Selection", Sep. 30, 2003, Springer-Verlag, pp. 71-85.*

(Continued)

*Primary Examiner*—Hung Q Pham
(74) *Attorney, Agent, or Firm*—Allen, Dyer, Doppelt, Milbrath & Gilchrist, P.A.

(57) ABSTRACT

A method for managing fixed-area video segments from fixed-area security cameras using a media asset management system includes collecting the fixed-area video segments from the fixed-area security cameras, associating corresponding geospatial data with each fixed-area video segment, and creating a search thesaurus including search descriptors with cross-references therebetween. At least one respective search descriptor from the search thesaurus is associated with each fixed-area video segment. The method further includes storing each fixed-area video segment, its geospatial data and its at least one search descriptor on the media asset management system for later search and retrieval, such as by a security organization. The search descriptors may be geospatial search descriptors that are cross-referenced in a hierarchical relationship.

48 Claims, 21 Drawing Sheets

U.S. PATENT DOCUMENTS

| | | | |
|---|---|---|---|
| 6,292,215 B1 | 9/2001 | Vincent | 348/169 |
| 6,304,864 B1 | 10/2001 | Liddy et al. | 706/15 |
| 6,360,234 B2 | 3/2002 | Jain et al. | 707/500.1 |
| 6,463,444 B1 | 10/2002 | Jain et al. | 707/104.1 |
| 6,512,857 B1 | 1/2003 | Hsu et al. | 382/294 |
| 6,523,046 B2 | 2/2003 | Liu et al. | 707/104.1 |
| 6,539,055 B1 | 3/2003 | Hazra | 375/240.16 |
| 6,564,225 B1 | 5/2003 | Brogliatti et al. | 707/104.1 |
| 6,567,980 B1 | 5/2003 | Jain et al. | 725/61 |
| 6,573,908 B1 | 6/2003 | Jang | 345/723 |
| 6,580,437 B1 | 6/2003 | Liou et al. | 345/719 |
| 6,587,601 B1 | 7/2003 | Hsu et al. | 382/294 |
| 6,597,818 B2 | 7/2003 | Kumar et al. | 382/294 |
| 6,681,231 B1 | 1/2004 | Burnett | 707/104.1 |
| 6,956,573 B1 * | 10/2005 | Bergen et al. | 345/473 |
| 7,231,379 B2 * | 6/2007 | Parikh et al. | 707/2 |
| 2002/0035451 A1 | 3/2002 | Rothermel | 703/1 |
| 2002/0055924 A1 | 5/2002 | Liming | 707/100 |
| 2002/0183072 A1 | 12/2002 | Steinbach et al. | 455/456 |
| 2003/0050927 A1 | 3/2003 | Hussam | 707/5 |
| 2003/0187819 A1 | 10/2003 | Gutierrez et al. | 707/1 |
| 2003/0215110 A1 | 11/2003 | Rhoads et al. | 382/100 |
| 2004/0008866 A1 | 1/2004 | Rhoads et al. | 382/100 |

FOREIGN PATENT DOCUMENTS

| | | |
|---|---|---|
| WO | 98/21688 A1 | 6/1998 |
| WO | 01/41000 | 6/2001 |
| WO | 01/98925 | 12/2001 |

OTHER PUBLICATIONS

Product brochure, Geospatial Imaging solutions from SGI, 2000 Silicon Graphics, Inc.

O'Sullivan et al., Capturing Task Knowledge for Geo-Spatial Imagery, Oct. 23-25, 2003, pp. 78-87.

News release, Harris Corporation Extends Automation Capabilities with Full Media Asset Management System—Broadcast Asia, Singapore, Jun. 18, 2002.

* cited by examiner

MEDIA ASSET MANAGEMENT SYSTEM FOR MANAGING VIDEO SEGMENTS FROM FIXED-AREA SECURITY CAMERAS AND ASSOCIATED METHODS

FIELD OF THE INVENTION

The present invention relates to the field of computer systems, and more particularly, to a media asset management system, such as for security organizations.

BACKGROUND OF THE INVENTION

In the past few decades, there has been a dramatic increase in the amount of digital information being generated and stored. This accumulation has taken place at an explosive rate. The sheer volume of information available over the World Wide Web and corporate networks continues to accelerate. Broadcast organizations, advertising agencies, consumer products and services companies, and other businesses have demanding media asset management needs. Since media assets are very crucial to these organizations, they have a need for an efficient way to catalog, browse, search and manage their media assets.

A digital asset management (DAM) system customized around a particular domain or business area allows an organization to efficiently and accurately capture knowledge about, manage and exploit their enormous stores of data. Digital asset management has been broadly identified as the technologies involved with creating, acquiring, managing, storing and retrieving digital assets.

As a subset to this technology, media asset management (MAM) can be further characterized as an advanced set of tools that enable media-rich organizations the ability to manage time-based content, such as audio and video, in addition to other items of value, such as imagery, office documents and text. The two key benefits associated to this class of technology are asset and value. An asset, i.e., stored data, has little intrinsic value if it cannot be located in a timely manner or at all. The value of an asset can only be realized if it can be efficiently and accurately identified, stored, retrieved and reused.

One approach for a media asset management system is offered by the current assignee of the present invention, and is known as the Invenio™ media asset management system. The Invenio™ media asset management system streamlines the ingest process of digitally recording media into a required format, and creating meaningful metadata, i.e., encapsulated "information about information" that is essential for future usability. An intelligent archiving links digitally recorded media to a search engine so that it can be later located and retrieved. In addition, video segments can be marked using a keyword list and synonyms that link similar content for deeper links and associations.

Another media asset management system is disclosed in U.S. Pat. No. 6,567,980 to Jain et al. Video segments are cataloged according to predefined or user definable metadata. The metadata is used to index and then retrieve encoded video segments. Video metadata track processors convert metadata tracks of video information to produce displayable frames containing hyperlinks between displayable data. Stored video information may be browsed, and hyperlinked frames of metadata track representations are displayed for selection.

An integrated information processing system for geospatial media is disclosed in U.S. Pat. No. 6,681,231 Burnett, in which visual, audio, textual and geospatial data is processed. A geospatial media recorder places geospatial data on each frame of the video segment. A geographic information system for managing and coordinating collected aerial imagery is disclosed in U.S. Patent Application No. 2004/0008866 to Rhoads et al. Digital watermarks are used to convey information that is used to register or align geographic images with a corresponding image location.

Despite the different types of media asset management systems available, security organizations in particular have a challenging problem of managing their video segments. When monitoring an airport or a shipping port, for example, multiple fixed-area security cameras are used, with each fixed-area camera providing surveillance on a particular area of interest. This results in a large volume of temporal and location based media being generated on a daily basis, which compounds the problem.

SUMMARY OF THE INVENTION

In view of the foregoing background, it is therefore an object of the present invention to improve the efficiency in which fixed-area video segments are collected and/or stored for later search and retrieval, such as by a security organization.

This and other objects, features, and advantages in accordance with the present invention are provided by a method for managing fixed-area video segments from at least one fixed-area security camera using a media asset management system comprising collecting the fixed-area video segments from the at least one fixed-area security camera, associating corresponding geospatial data with each fixed-area video segment, and creating a search thesaurus comprising a plurality of search descriptors with cross-references therebetween. The method may further comprise associating at least one respective search descriptor from the search thesaurus with each fixed-area video segment, and storing each fixed-area video segment, its geospatial data and its at least one search descriptor on the media asset management system for later search and retrieval.

The at least one fixed-area security camera may comprise a plurality of fixed-area security cameras. Collecting the fixed-area video segments and associating the corresponding geospatial data may be performed using a geospatial video recorder. The geospatial data may comprise latitude and longitude. The plurality of search descriptors may comprise a plurality of geospatial search descriptors, and the plurality of geospatial search descriptors may be cross-referenced in a hierarchical relationship.

The geospatially enabled media asset management system in accordance with the present invention advantageously allows security organizations to more efficiently manage fixed-area video segments provided by their fixed-area security cameras. Security organizations are thus able to more efficiently manage their fixed-area video segments by associating geospatial data with each fixed-area video segment, and creating a geospatial thesaurus for the media asset management system. The geospatial thesaurus includes a hierarchy of globally unique locations and their geospatial coordinates. These locations are spatially indexed so that a user search query returns fixed-area video segments within a geographical search area or within a specified distance from a search point.

The method may further comprise associating content data with the fixed-area video segments. The content data may comprise a date and a time each fixed-area video segment was collected. In addition, the content data may comprise at least one of a topic, a location term, a landmark and an event. The method may further comprise associating textual data with the fixed-area video segments. Associating textual data with the fixed-area video segments may comprise transcribing audio from the video segments into text.

The method may further comprise generating at least one user search query, comparing the at least one user search query with the search thesaurus for identifying at least one additional search query, searching the fixed-area video segments based upon the at least one user search query and the at least one additional search query, and retrieving at least one fixed-area video segment based upon the search. The at least one retrieved fixed-area video segment may be played back while displaying a map corresponding to its geospatial data. The method may further comprise analyzing the at least one retrieved fixed-area video segment using a scene detection algorithm.

Alternately, the method may further comprise selecting a geographical area of interest on a map display, generating at least one user search query, and searching the fixed-area video segments based upon the at least one user search query and the geographical area of interest. The at least one user search query may be compared with the search thesaurus for identifying at least one additional search query.

Another aspect of the present is a method for searching and retrieving fixed-area video segments from at least one fixed-area security camera stored on a media asset management system, with the media asset management system also having stored thereon a geospatial search thesaurus comprising a plurality of geospatial search descriptors with cross-references therebetween, and each fixed-area video segment having corresponding geospatial data associated therewith and also having at least one respective geospatial search descriptor from the geospatial search thesaurus associated therewith. The method may comprise generating at least one user search query, with the at least one user search query including geospatial data, and comparing the at least one user search query with the geospatial search thesaurus for identifying at least one additional search query. The fixed-area video segments are searched based upon the at least one user search query and the at least one additional search query. At least one fixed-area video segment is retrieved based upon the search.

Another aspect of the present invention is directed to a media asset management system comprising a media interface for collecting fixed-area video segments from at least one fixed-area security camera, with each fixed-area video segment having corresponding geospatial data associated therewith, and a memory for storing a search thesaurus comprising a plurality of search descriptors with cross-references therebetween. A processor may associate each fixed-area video segment with at least one respective search descriptor from the search thesaurus. A database may store each fixed-area video segment, its geospatial data and its at least one search descriptor for later search and retrieval by a security organization.

Another aspect of the media asset management system comprises a memory for storing a geospatial search thesaurus comprising a plurality of geospatial search descriptors with cross-references therebetween, and a database for storing fixed-area video segments from at least one fixed-area security camera, each fixed-area video segment having corresponding geospatial data associated therewith and also having at least one geospatial search descriptor from the geospatial search thesaurus associated therewith. A user input interface permits a user to generate at least one user search query, with the at least one user search query including geospatial data. A processor may compare the at least one user search query with the geospatial search thesaurus for identifying at least one additional search query, and searching the fixed-area video segments based upon the at least one user search query and the at least one additional search query. A display may display the at least one retrieved fixed-area video segment.

BRIEF DESCRIPTION OF THE DRAWINGS

FIGS. 15-17 are various display screens for an indexing tool in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
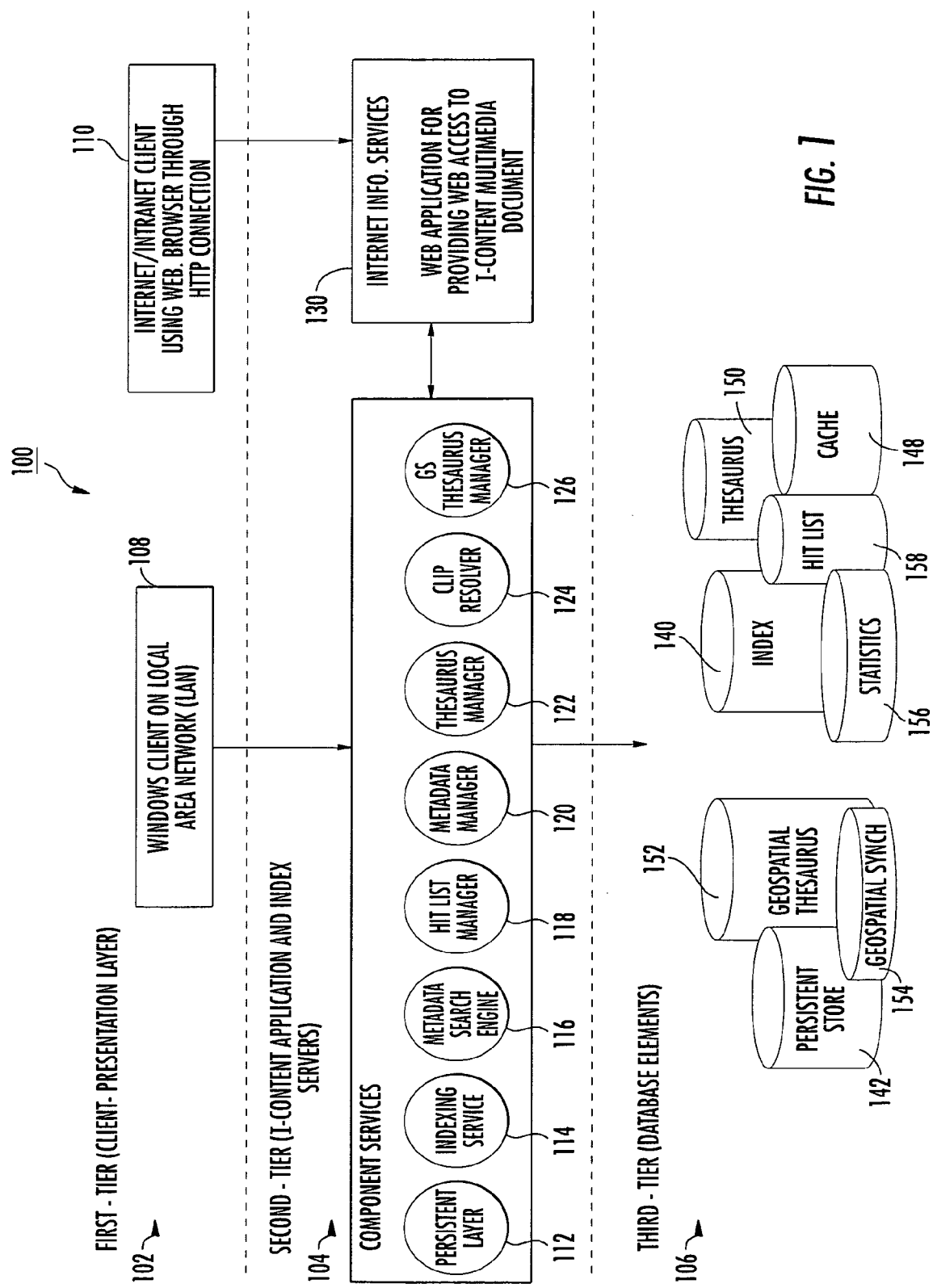
FIG. 1 is a block diagram of the geospatially enabled media asset management system separated into multiple-tiers in accordance with the present invention.
Figure 2:
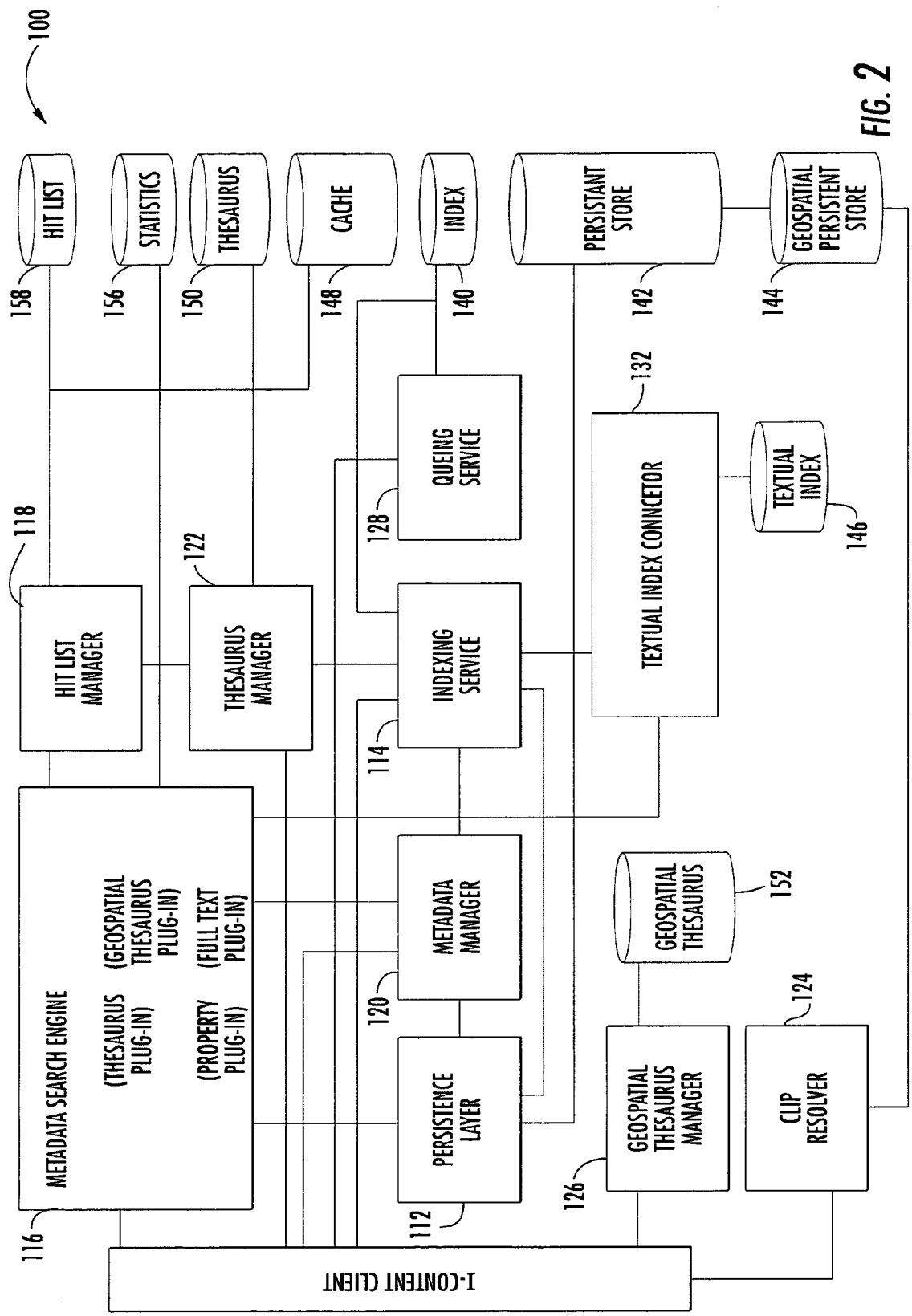
FIG. 2 is a block diagram illustrating the architecture layout of the geospatially enabled media asset management system in accordance with the present invention.

An architecture overview of a geospatially enabled media asset management system 100 will initially be discussed with reference to FIGS. 1 and 2. The geospatially enabled media asset management system 100 allows multimedia organizations, such as a news broadcasting organization for example, to more efficiently manage their video news segments. This is accomplished by associating geospatial data with each video news segment, and creating a geospatial thesaurus for the system 100, as will be discussed in greater detail below.

The geospatial thesaurus includes a hierarchy of globally unique locations and their geospatial coordinates. These locations are spatially indexed so that a user search query returns video news segments within a geographical search area or within a specified distance from a search point. The geospatially enabled media asset management system 100 may be separated into three tiers 102, 104 and 106. The first-tier 102 is the client-presentation layer, the second-tier 104 is the server or application layer, and the third-tier 106 is the database layer.

Users interface the system 100 through the first-tier 102. One or more workstations connect to the geospatially enabled media asset management system 100 though a local area network (LAN) 108 or through an Internet/intranet browser 110. User search queries are defined at this level for the system 100, and the results are also presented at this level.

The various components that make up the system 100 may reside in one or more servers, as readily appreciated by those skilled in the art. The second-tier 104 components include a Persistence Layer 112, an Indexing Service 114, a Metadata Search Engine 116, a Hit List Manager 118, a Metadata Manager 120, a Thesaurus Manager 122, a Clip Resolver 124, and a Geospatial Thesaurus Manager 126. The Internet Information Services (IIS) 130 is a web application server for providing web access to the second and third-tiers 104 and 106.

The Persistence Layer 112 interfaces all of the databases and interfaces the other system components. The Indexing Service 114 builds the Index Database 140, and indexes new contents as they are created or as their position in the queue becomes current. The Persistence Layer 112 provides access to the Persistent Store Database 142 and the Geospatial Persistent Store Database 144, and receives XML-based requests from the different service components, and translates them to the database specific SQL (Structured Query Language) requests depending on the particular database. Indexing takes place after a new segment is inserted into the system 100. During indexing, segment data is inserted into the Textual Index Database 146 and the Cache Database 148.

Segment modification events are monitored by an event listener. Each time a segment insert or update event takes place, a segment object identifier (OID) is placed into an indexing queue. A Queuing Service 128 builds and manages the list of segment to be indexed. A Textual Index Connector 132 allows full-text searches using the Metadata Search Engine 116.

The Metadata Search Engine 116 is the coordinator of all the search processes. The Metadata Search Engine 116 executes user search queries on the full-text index, the metadata properties, the geospatial properties and the thesauruses, and then returns the combined results. Search requests arrive from the client side, i.e., via the first-tier 102, to this component in an XML format.

The Hit List Manager 118 correlates search results from multiple search engine plug-ins, such as from a Thesaurus Search Engine plug-in and a Geospatial Thesaurus Search Engine plug-in, into one integrated list "pages" and stores the search results in the Hit List Database 158. The Metadata Manager 120 allows the user to define which metadata fields will be indexed and cached. The Thesaurus Manager 122 allows a user search query to be compared with the Thesaurus Database 150 for identifying additional user search query. The Geospatial Thesaurus Manager 126 also allows a user search query to be compared with the Geospatial Thesaurus Database 152 for identifying additional user search query. The Clip Resolver 124 retrieves video news segments that satisfy the geospatial user search query from the Geospatial Persistent Store Database 144.

Referring now to the third-tier 106, the main database is the Persistent Store Database 142. This database contains all the system objects and content metadata. It stores metadata for "content" objects, including: content type, creation date, version, owner, description, original source, links to related documents, links to thesaurus entries and geospatial thesaurus entries, and content descriptors such as who, what, where and when.

The term content refers to a "media asset" stored within the system 100, such as a video clip, with or without audio, and text. The term metadata refers to data describing the attributes of content, such as its date of creation, type of media, file size, video resolution, audio sample rate, origin, owner, related concepts, keywords, content, documents, people and places, transcripts of any speech, copyright information and any other data considered useful by the users of the geospatially enabled media asset management system 100.

The Thesaurus Database 150 is a multi-lingual dictionary that stores terms and their relationships to other terms. A term may be linked to another term by a hierarchical relationship, an associative relationship or an equivalence relationship.

The Thesaurus Database 150 is a book of descriptors about a particular field or set of concepts, including their synonyms. In addition, the thesaurus includes a list of subject descriptors with a cross-reference system for reference and retrieval.

In a hierarchical relationship, terms are linked with other terms for expressing more general or more specific concepts. That is, broader terms and narrower terms are linked together. For example, a broad term such as food can be linked with fruits, and fruits can be linked with a narrower term such as oranges, which can be further linked to naval oranges.

In an associative relationship, terms are linked with similar or related terms where the relationship between the terms is non-hierarchical. In an equivalence relationship, "non-preferred" terms are linked with synonyms or quasi-synonyms that act as "preferred" terms. Non-preferred terms may be indicated by the prefix UF, whereas the reciprocal of this relationship may be indicated by the prefix USE. For example, the following terms are all the same type of orange: citrus reticulate, tangerine and mandarin.

The Geospatial Thesaurus Database 152 stores a hierarchy of globally unique locations and their geospatial coordinates. For example, a hierarchical relationship may be the following: continent, country, region, subregion, city and landmarks. Even the landmarks may be broken down into specific type landmarks. The Geospatial Thesaurus Database 152 is spatially indexed to allow user search queries to return video news segments within a geographical search area or within a specified distance from a search point.

The Geospatial Persistent Store Database 144 is a combination of the standard Persistent Store Database 142 and the Geospatial Sync Database 154. This database allows geospatial searching of persistent store content. The Index Database 140 contains the database index for the Persistent Store Database 142 to aide the system 100 in search and retrieval. The Statistics Database 156 contains the search statistics. The Hit List Database 158 holds the search results from the various search engine plug-ins. Recently accessed documents by the system 100 are stored in the Cache Database 148. This reduces access time when repeating a user search query. The Textual Index Database 146 contains the full-text index for use with the Textual Search Engine plug-in.

Figure 3:
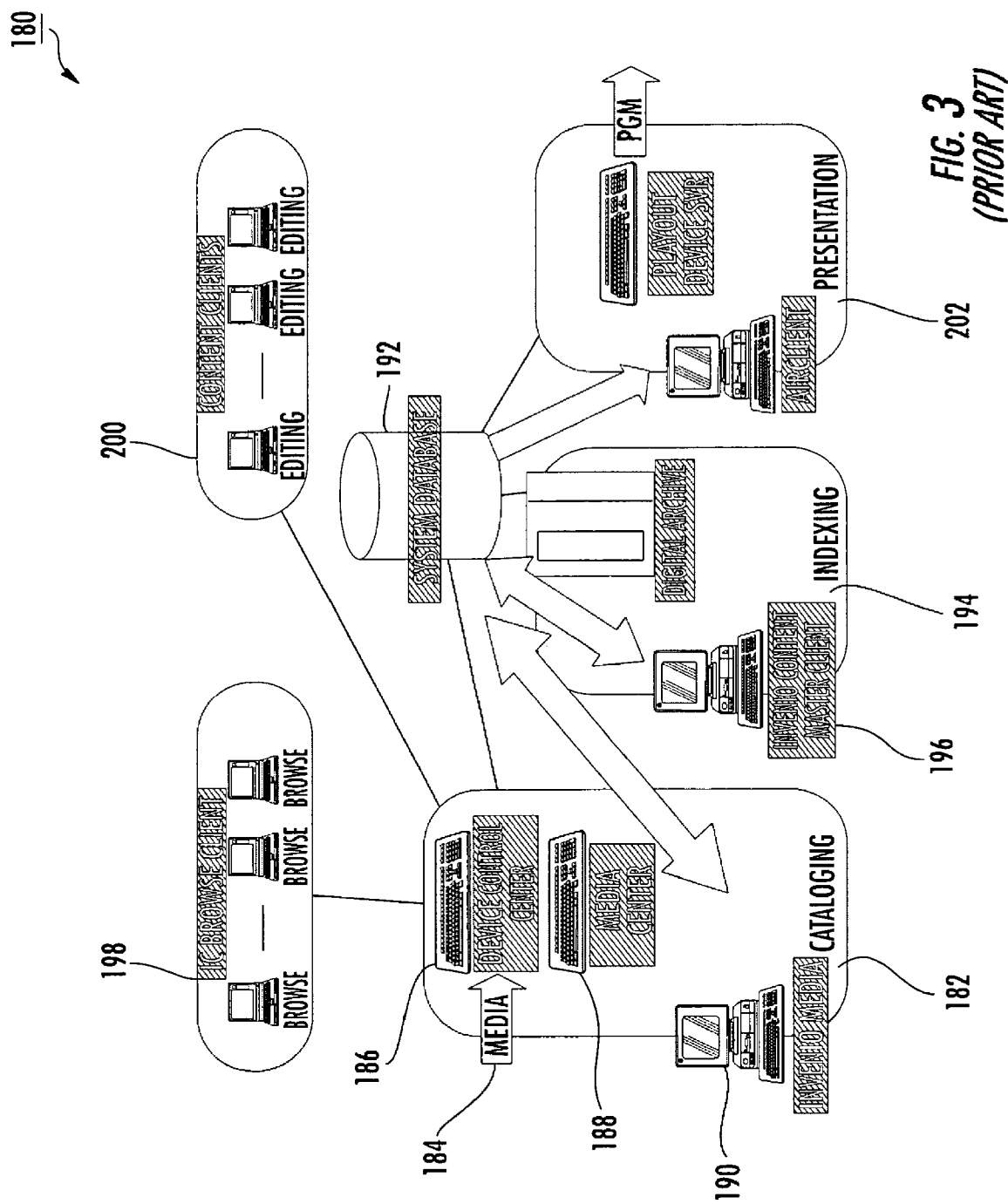
FIG. 3 is a top-level block diagram of the Invenio™ media asset management system in accordance with the prior art.

The current assignee of the present invention currently provides a media asset management system 180, a top-level block diagram of which is illustrated in FIG. 3. This media asset management system 180 is based upon a series of software components falling under the Invenio™ product line. The present invention enhances several of the Invenio™ components to provide the geospatially enabled media asset management (GMAM) system 100. Overall information about the Invenio™ media asset management system will initially be discussed, followed by a discussion on the Invenio™ components that are modified to provide the geospatially enabled media asset management system 100.

Invenio™ is a single source, enterprise-wide media asset management system providing for the acquisition, definition, editing, storage and retrieval of multimedia. The various components of the Invenio™ system include ingesting, cataloging, thesaurus and archiving. With Invenio™, multimedia organizations are able to i) ingest and store almost any type of media asset, ii) research and interrogate their media database, iii) browse and select media for retrieval, iv) edit the media, and v) transfer the media where and when it is needed and in the required format when used in conjunction with various automation technologies.

The Invenio™ system is compatible with various browsing and global media transfer technologies. These technologies in conjunction with the Invenio™ system are offered to broadcast customers as an end-to-end, enterprise-wide approach that makes media available when it is needed, where it is needed, and in the format that is required.

The Invenio™ system is based upon a number of software components. The main software components are Invenio™ Media (I-Media), Invenio™ Content (I-Content), Invenio™ Browse (I-Browse), Invenio™ Browse XP (I-Browse XP), Invenio™ Web (I-Web), and Invenio™ Search OCX (I-Search OCX).

Still referring now to FIG. 3, the media ingest or cataloging is performed in Block 182. Media 184 is received or collected by a device control system 186. Metadata 188 is extracted from the media 184 using the I-media component 190. The device control system 186 controls the device providing the media 184, such as a video news camera, for example.

The metadata 188 is stored in a system database 192 for later search and retrieval. Indexing on the metadata 188 is performed in block 194, and the I-Content component 196 allows a user 198 in a browse mode to search metadata 188 based upon text and content. The I-Content component 196 also allows new text and content, i.e., new metadata 188, to be entered by a user 200 in an editing mode as the media is being viewed. The I-Content component 196 functions as an application server since it interfaces between the users 198, 200 and the system database 192, as well as with other components of the media asset management system 180.

Each of the different users 198, 200 interfaces the system database 192 via their respective workstations. The presentation of data is provided to the users in Block 202. Even though the cataloging 182, indexing 194, presentation 202 and the database 192 are shown as separate blocks, they may all be integrated into a single server, as readily appreciated by those skilled in the art.

Modification of selected Invenio™ components to provide the geospatially enabled media asset management system 100 in accordance with the present invention will now be discussed. A series of steps were involved to create the geospatially enabled media asset management system 100. These steps are listed as follows:

1) Several new classes were defined and added to the default I-Content Persistent Store Database scheme using QDI-proprietary XML tools;

2) A new database scheme called gs_admin and accompanying PLSQL code was created to manage and manipulate the geospatial objects associated with the video metadata stored in the I-Content Persistence Store Database;

3) A tool was created to simultaneously populate the I-Content Persistence Store classes and the gs_admin scheme with the selected video metadata and geospatial information;

4) A new database scheme called ths_admin and accompanying PLSQL code was created to manage and manipulate the location data associated with the geospatial thesaurus;

5) A tool was created to populate the ths_admin scheme with geospatial location data;

6) The client-side I-Content graphical user interface (GUI) was modified to include a new GIS map/query interface, a geospatial search results window/clip viewer, and a geospatial thesaurus query capability;

7) The I-Content server-side COM+ search engine component was modified to support a new geospatial search type;

8) A new server-side COM+ component was created to query the gs_admin database scheme, and return the geospatial search results to the main I-Content search engine component;

9) A new server side COM+ component called Clip Resolver was created to return the geospatial clip search results to the I-Content client-side GUI; and 10) A new, server side COM+ component called GSThesaurus was created to query the geospatial thesaurus scheme and return the results to the I-Content GUI.

The I-Media component, which is similar to the Invenio™ system 180, will now be discussed in greater detail with respect to the geospatially enabled media asset management system 100. The I-Media component controls video tape recorders (VTRs) including geospatial VTRs, scanners and multiple resolution video servers, and is the heart of the content ingestion process. Some of the tasks the I-Media component performs include media ingest, batch digitizing, feed recording and cataloging.

In particular, this component manages media ingest, shallow metadata definition, and quality checks for video, audio, web multimedia, scripts, documents, photographs and clippings. The I-Media component controls devices in use by an automation system via connectivity to the device control system, or directly controls the devices. Its value is the ability to offer a wide range of tools and features that assist in the live and post production process. The I-media component also adopts best practice vocabulary control conventions that make it an ideal portal for content management systems.

Featured functionality includes simultaneously ingesting in high and low resolution, initiating archive of recorded material, and initiating transcode of recorded material. The I-media component is able to index or log material on-the-fly with hotkey and keyword list features, create thumbnails during ingest, and create, execute and/or export edit data lists (EDLs) to third party NLE systems. This component is highly configurable in that a client can configure up to 250 metadata fields for specific ingest and indexing operations. Keyword lists assist in vocabulary control, which is vital for any asset management system to be effective. It also hands media off to media processing technologies such as speech-to-text, video OCR and structure recognition technologies.

The media ingest task includes connectivity to high-resolution storage devices, and concurrent browse resolution content definition. In the batch digitizing task, the I-Media offers self-contained multitask control multiple VTRs/video servers to ingest all incoming material with frame accuracy. In the feed recording task, the I-Media can be set for timed recordings of satellite or network feeds, or straightforward recordings onto video servers or videotape devices. In particular, corresponding geospatial data is collected for all incoming material.

For the cataloging task, the I-Media allows the user to define the media being ingested with a full array of indexing modes. This is done while recording. An automatic mode automatically captures thumbnail and low resolution browse proxy images. A standard mode has an unlimited number of thumbnail images in each shot. A mark mode identifies events in live programming, sports or news to prepare highlights and sub-clips (video server dependent). A continuous mode records live feeds for news interviews or programming with on-board, low resolution browse capability in MPEG1 or MPEG4 for later review.

Figure 4:
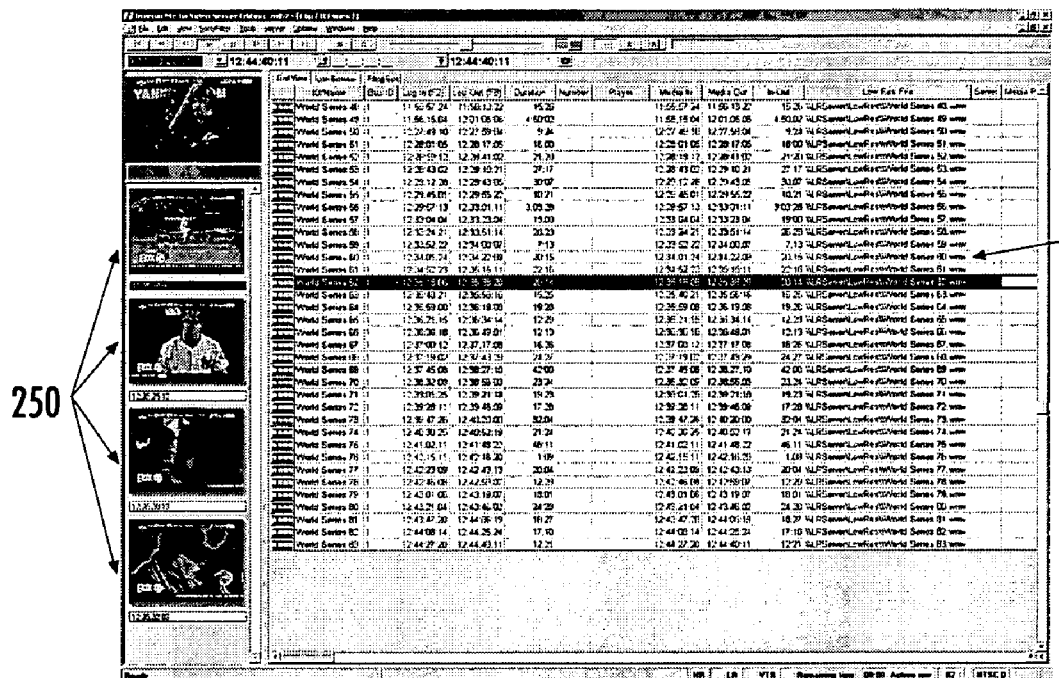
FIG. 4 is a display screen providing metadata information on video segments being ingested by the geospatially enabled media asset management system in accordance with the present invention.

An example display screen of a user workstation illustrating media being ingested is provided in FIG. 4. Thumbnails of the video frames are provided in field 250, and the corresponding metadata associated with the thumbnails are provided in field 252. Metadata includes the name of the video news segment, reel number, time in/our and duration. Other metadata information includes geospatial data, such as longitude and latitude, corresponding to the video news segment being displayed. Thumbnails allow the user to easily determine the content of the video news segments.

I-Media can also integrate with third party plug-ins to populate the media metadata fields. For example, speech-to-text or closed-captioning sources can be added to the indexing process. I-Media is compatible with any ODBC. The database is user configurable, with unlimited thumbnail image capture capability and hierarchical key word lists.

Figure 5:
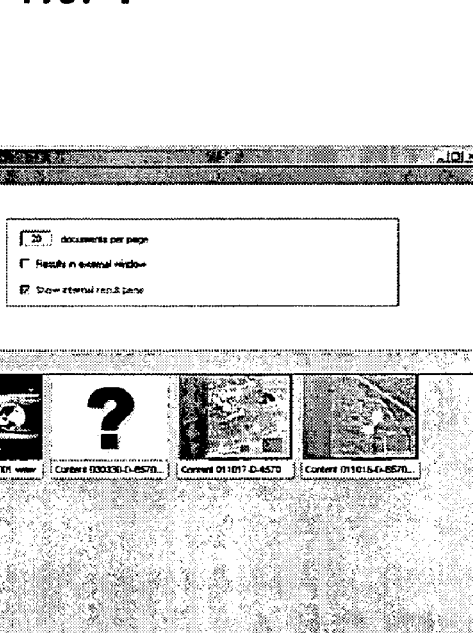
FIG. 5 is a display screen providing an object search of the metadata information in the geospatially enabled media asset management system in accordance with the present invention.

The system 100 is flexible and expandable. Any user workstation can search and view media connected to the various databases in either a low or a high resolution mode from any place with network connectivity. The searching may be based upon an object search, for example. Thumbnails of the metadata may be provided to the client on their display screen in field 254, as illustrated in FIG. 5. Each thumbnail has a hyperlink associated therewith to the corresponding video segments in the system databases. A user can also perform media management of material and exchange quality control (QC) logs, edit data lists (EDLs) or material bins with non-linear editing systems using industry standard file conventions.

Figure 6:
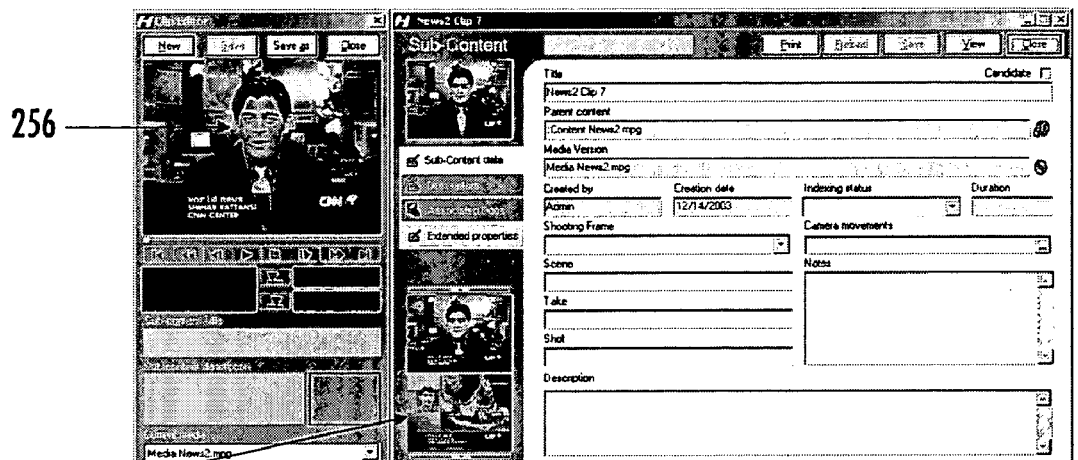
FIG. 6 is a display screen providing metadata information for a selected video frame collected by the geospatially enabled media asset management system in accordance with the present invention.

The I-Content component services 112-126 provide deep indexing capabilities, scene detection, thesaurus and geospatial thesaurus tools, search, browse, segment media and administration utilities. While the I-Media component prepares the media for shallow archiving, the I-Content is for metadata creation and rough cataloging processes, and is the key to a successful asset management strategy. A display screen of a user workstation providing metadata to the user is illustrated in FIG. 6. In particular, field 256 indicates where the user is in the video segment via a thumbnail, and field 258 provides thumbnails on the remainder of the video segment. Various text boxes are also included to provide additional information.

The I-Content provides a long-term, research and archive system for material storage. The ability to ingest material and add a limited set of metadata to the video segments is an inherent feature in most media and content management systems. However, it is a rudimentary approach. Benefits that can be derived by utilizing library science best practices in the management of a news broadcaster's assets in the digital domain have now been leveraged on a wide scale. Thesaurus based indexing/geospatial thesaurus based indexing and searching is a step in that direction, and is part of the methodology for library management in accordance with the present invention.

Thesaurus based indexing gives the client the ability to apply diverse associations to the video segments, which greatly enhances search results by finding material that is relevant to the subject matter regardless of whether the media descriptor or identifier is listed as a keyword. The value here is as follows; if you can't find it, the asset does not exist and the "unfound" media's value is literally lost. Thesaurus library management tools improve how effective the material can be indexed and located. It also allows a client to control vocabulary, and make its specific company culture part of the library management scheme.

Featured functionality of the I-Content component includes locating and browsing media or video segments ingested by the I-media component or by automation, and indexing using a metadata model, scene detection or thesaurus tools. Additional functionalities include segmenting material, creating associations at the media (micro) level, creating associations at the database (macro) level, and performing thesaurus/geospatial thesaurus and hybrid searches. The I-Content also drills down into search results and demonstrates the value of improved search capability. Thesaurus/geospatial thesaurus and extensive wordlists are built using librarian administration utilities, and broad system security administration utilities are provided.

The I-Content index process improves the accuracy and relevancy of the query results by applying hybrid based indexing with both thesaurus/geospatial thesaurus and/or full text searching operations, using synonyms and linked concepts, even across multiple languages.

In addition, the I-Content component utilizes built-in detection for scene changes. This enables an operator to create a storyboard like description of the content for indexing. Sub-clips or extracts can be made from the parent clip that are always directly referenced back to the parent, so the original content is easy to find.

Figure 7:
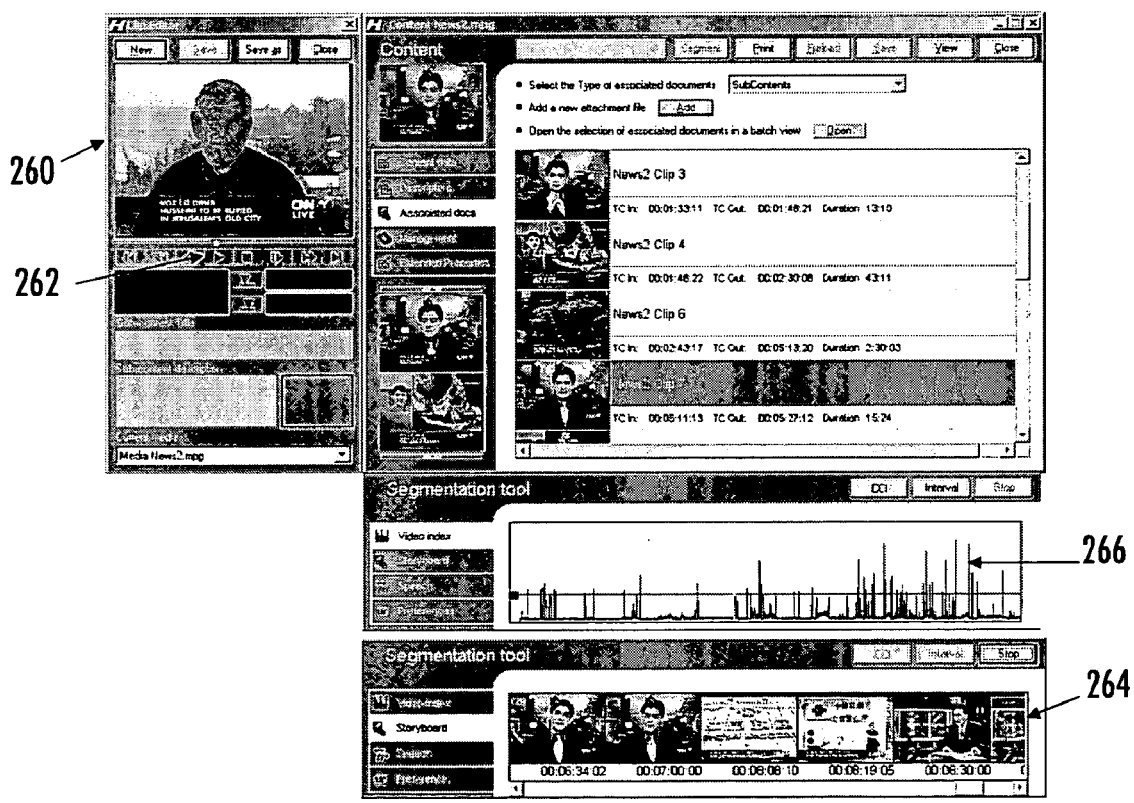
FIG. 7 is a display screen providing scene detection information for a video segment collected by the geospatially enabled media asset management system in accordance with the present invention.

A display screen of a user workstation providing scene detection information in illustrated in FIG. 7. Field 260 tells the user where the image is in the video segment. When the video segment is being played back, a bar 262 moves across the screen. Scene changes from one frame to the next are provided in fields 264 and 266. The threshold or sensitivity of the scene detection module can be set to a desired level. For example, the sensitivity may be set to detect the slightest movement of an image from one frame to the next. Alternately, the sensitivity may be set so that there is a significant movement from one frame to the next before detecting a change in movement.

Figure 8:
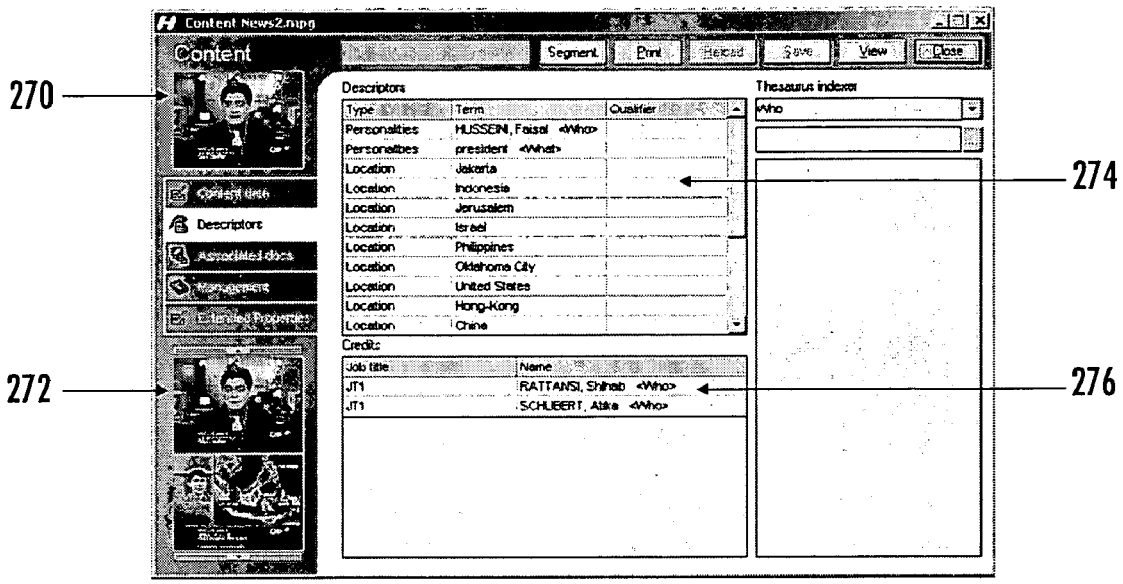
FIG. 8 is a display screen providing indexing and cataloging information for a video segment collected by the geospatially enabled media asset management system in accordance with the present invention.

A display screen of a user workstation providing indexing and cataloging information is illustrated in FIG. 8. A quick view of the video segment is provided in field 270. Thumbnails from the scene detection modules are provided in field 272. Associated search descriptors attached to the video segment are provided in fields 274 and 276. A content descriptor tree, that is, the thesaurus and geospatial thesaurus terms associated with the video segments are also provided in fields 274 and 276.

For archive management, the I-Content component gathers media search descriptors and technical data such as creation or media location for high and low resolution files. From these metadata fields, the I-Content component generates lists of media to be sent to deep archives and off-line storage devices. Of course, this media can quickly be restored to on-line storage, or modified/packaged for other uses. The I-Content component interfaces with hierarchical storage management devices that support device control protocols, such as NDCP and VACP.

Figure 9:
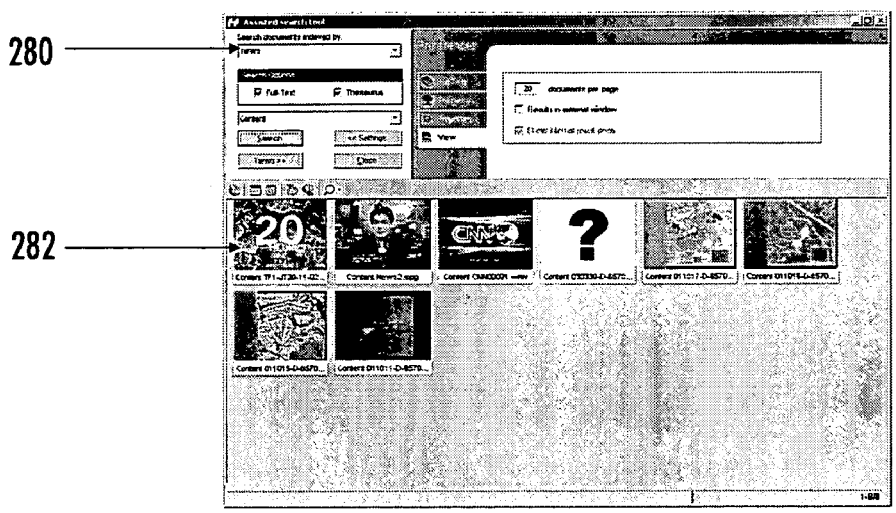
FIG. 9 is a display screen providing a query result window based upon a query search performed by the geospatially enabled media asset management system in accordance with the present invention.

For media retrieval, the I-Content component offers three search modes. A full text search searches all the describer fields, a comparative search searches in the fields containing numerical values (dates in particular), and an indexed document search. Once elements have been collected in an album, a click is all that is needed to load the original document with its associated software application. A display screen of a client workstation providing a query result window is illustrated in FIG. 9. A query or search field is entered in field 280. Based upon the entered search query, matching thumbnails are provided in field 282.

Figure 10:
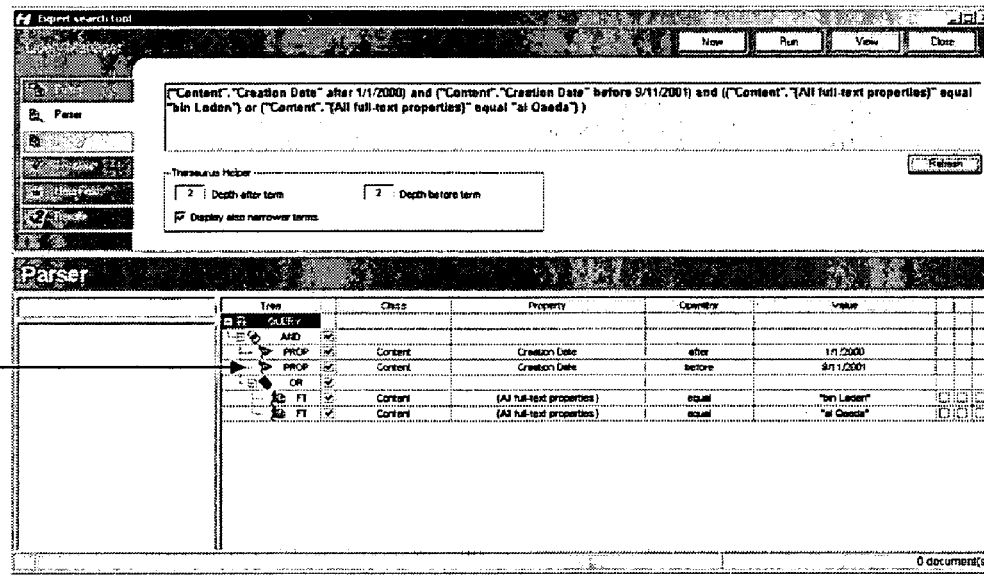
FIG. 10 is a display screen providing a query management window for performing a more complex query search by the geospatially enabled media asset management system in accordance with the present invention.

If a keyword search is not sufficient, then a complex query may be used. A display screen of a client workstation providing a query management window is illustrated in FIG. 10. For example, in a news application, journalists may use the I-Content application to make shot selections. Producers can validate material for broadcast using fields 286. Archived clips can be effectively found and repurposed no matter where they are in storage. Rating control or competition monitoring can be managed, researched and cataloged.

In the illustrated example, the database is the Microsoft SQL 2000 relational database because it functions with speed and efficiency, and is optimized for multiple concurrent users. It also natively supports intranet and Internet connectivity over standard protocols, with assignable user privilege levels.

The object-oriented interface makes the dictionary and thesaurus/geospatial thesaurus intuitive and easy to use. Multiple windows allow each user to configure the workspace to personal preferences. These settings can be saved and referenced to their individual system login profiles, presenting a consistent, personalized user interface, no matter where the client logs in.

For system and access rights administration, maximum protection and management flexibility is to be provided. Comprehensive control of user groups, attributes and operational feature access is possible. Rights management is available on standard Windows 2000 based file-by-file and user-by-user granularity.

Third party digital rights management applications, such as those from consulting firms, can be integrated into the system 100 by using standards-based, message queuing and distributed transaction services built into the application suite.

Backup copies and database maintenance operations are fully configurable and take place in the background, without interrupting normal operation. The system 100 is able to store media queries or request results using XML. The I-Content component can export its request or resulting information to third party applications or production devices over OLE/ODBC connections.

The thesaurus and geospatial thesaurus are part of the I-Content component. Each document can be associated with thesaurus terms, which describes document contents. The thesaurus contains selected words or concepts, such as a specialized vocabulary of a particular field, such as medicine or music, for example. The thesaurus contains not only the words, but contains the words in a hierarchical format. From each word a user can navigate to the boarder term of the words or if it is exist, to the narrower term. A hierarchical model of storing terms allows for a more efficient search.

The thesaurus has a multi-language support. It is possible to have more than one dictionary. Languages may include not only English but also French and Spanish, for example. All the applicable organizations can use and search the same database in their native language, which makes the search process easier.

Indexing is finding the important topics, facts, names and concepts in a subject, and organizing them in some order so that users (readers, researchers, reporters, etc.) can easily locate the information they need. Indexing is a special skill, not a mechanical function. Computers are essential in index production, but software alone cannot compile a truly useful index. It takes human intelligence to trace ideas and present them concisely and correctly in the index or database.

Automatic indexing programs do not have the ability to formulate concepts that are not explicitly stated in the text, for example, nutrition where only specific food items are discussed. Nor can they identify related topics (sonnet and poetry) or distinguish between similar terms (New York for New York City and New York State).

A good index identifies information a user might look for, collects the different ways of wording the same concept, and provides subentries to guide researchers directly to a specific aspect of a topic. Substantial information is distinguished from passing mention, and information for the researcher is filtered to prevent burnout.

When a user looks for information about the "sleeping habits of the arctic fox," it is not enough to search for "fox". The librarian should add to the object more specific indexing terms to make the information retrievable. In case of the fox, the object must have been indexed with terms like arctic, fox, habits, dormancy habits, winter habits, for example. The librarian has the main responsibility in each case. Without a correct thesaurus, each librarian would index a document (object, film, picture, etc.) in their own way. Nobody would ever likely find the same information, as everyone does not think the same way.

In the thesaurus and geospatial thesaurus there are features which make the work of the librarian easier. Of course, to be able to use these features the applicable company or organization must have a complete and well-structured thesaurus and geospatial thesaurus, with all the possible cross-references. These cross-references make easier the searching process as well. For example, in a subject-heading list there will not be an association between Fidel Castro and Cuba. In a thesaurus the librarian can index a picture with Castro on it with the word Castro, and later during the search process, when a user searches for Cuba the user will probably retrieve Castro's picture back as hit. With respect to geospatial data, the geospatial thesaurus includes a hierarchy of globally unique locations and their geospatial coordinates. For example, a hierarchical relationship may be the following: continent, country, region, subregion, city and landmarks. Even the landmarks may be broken down into specific type landmarks. These locations are spatially indexed so that a user search query returns video news segments within a geographical search area or within a specified distance from a search point.

The I-Browse component is for searching and browsing low-resolution material, assembling shot lists and exporting material to folders. The user is then able to create cultists by populating folders with cut or whole media. I-Browse XP includes navigational tools, such as scene detection and speech-to-text recognition, which assist the client in their search for the specific media they are looking for. Once the desired media is located and the specific shot is located, I-Browse XP allows the user to assemble, register, review, import and export EDLs.

Browsing throughout the database makes an asset management system powerful in that it helps an organization to improve accessibility to its content. Low resolution browsing allows users to find media from their desktop via the house network. This allows employees in all departments, such as traffic, promotions, and production to locate media for use on the desktop. This helps improve workflow and business processes, and helps streamline the cost of doing business by allowing employees the ability to be productive on their standard office desktop. Featured functionality of the I-Browse component includes search and browse, segment material, and creating cultists by populating folders with content.

The I-Browse XP component also uses navigational tools such as scene detection and playback EDLs, and exports EDLs to folders. Access navigational tools (i.e., scene detection, speech-to-text recognition) assist in locating specific media/scenes, in creating, registering, previewing, importing and exporting EDLs.

The I-Web component is for searching and browsing, and populating folders from remote locations on the Internet or intranet using desktop web browser applications. The I-Browse functionality is available using a standard web browser. A software development kit (SDK) allows a user to personalize the look, feel and functionality of the web server.

Extending browse utilities on users' workstations make an asset management system powerful in that it helps an organization improve accessibility to its content. Extending these same capabilities beyond a core facility to business units and consumers with accessibility through the intranet or Internet using a standard web browser is especially powerful. Featured functionalities thus include searching and browsing, segmenting material, creating cultists by populating folders with content, and software development kits for ability to customize web server design and functionality.

The I-Search OCX component is a search utility integrated with third party applications. I-Search, which is a powerful search utility that is included with the standard I-Content application, is available in an OCX version. This allows the user to integrate a common search utility across all organization applications that support OCX applications, such as near line editing (NLE) and news control systems (NCS).

The content persistent layer and software development kits (SDK) will now be discussed in greater detail. The application layer or business logic is a single or multiple Windows NT 4.0 server(s)/Windows 2000 server(s), each running MTS (Microsoft Transaction Server, NT4), or COM+ (Component Services, W2K). There are 5 main COM objects that provide functionality of the system. The 5 main COM objects are i) Persistent Layer 112, ii) Searching 116, iii) Indexing 114, iv) Thesaurus 122, and v) Geospatial Thesaurus 126. The Persistent Layer 112 is the main component that handles I-Content documents as persistent objects and provides interface to the database for all other components. Also, the Persistent Layer 112 manages user's authorization. Web based clients 110 interface through a Web Application Server 130. Collected media and its corresponding metadata are stored in one or more databases.

Searching is performed for the I-Content documents and have highly configurable options. Information about document model and searching configurations can be retrieved using a Metadata Search Engine 116. For the index, document indexing is performed. For the thesaurus and geospatial thesaurus, which also includes their respective dictionaries, separate databases are stored (Microsoft Server Database Engine 2000) and can be used for indexing I-Content documents.

The database layer is a computer running on Windows NT 4.0/2000, Solaris, Unix or another operating system with the selected relational database management system. The database supports the connectivity with the MTS/COM server in the I-Content Application Layer 104. Currently, the I-Content supports the following databases: Microsoft SQL Server 2000; Oracle 8i family; IBM DB2 and Informix.

For the geospatially enabled asset management system 100, Oracle 9i R2 was used because of its spatial data types and search query capabilities. Each component performs its own task. All relationships between components inside and outside the application server are based on the XML requests (extended markup language). For example, an internal XML request from client to the Metadata Search Engine 116 maybe the following:

```
<Query Version="1.2.001" SearchSource="1">
  <Atom NodeType="FT" Stem="0" Typo="0" Case="0"
Visible="1" Except="0">
    <Class ID="EF60587E-46F9-4730-80EC-F662062F5D71" />
    <Property ID="00000000-0000-0000-0000-000000000000-
75929E3B-F61D-4B86-B6A9-9F9FDE8010EF-0"/>
    <Operator OpID="CONTAINS" />
    <Value Value="sport" />
  </Atom>
</Query>
```

It is possible to talk with kernel engines through XML requests, but not necessary. SDK provides the standard components, that is, the client frameworks that should be used on the GUI to have more simple access to application server components. The client frameworks include TH.CF—thesaurus client framework, GSTH.CF—geospatial thesaurus client framework, PL.CF—persistent layer client framework, and SE.CF—search client framework. Another reason to use client frameworks is that a next system version may use another internal format. Usual basic classes can be created, and all activity can be performed through those methods.

As stated above, the Persistent Layer 112 is the main component in the I-Content, which provides two general functions. One general function is to provide access to the main database. The Persistent Layer 112 receives XML-based requests from the components and translates them to the database specific SQL (structured query language) requests, which may be different for different databases. Another general function is to perform the user authorization procedure. For authorization, the I-Content component uses the hardware key, which should be plugged into the application server computer via a USB or LPT port.

Connection to the Persistent Layer 112 is based on the session method. Before any client requests are sent (any I-Content component, which in this particular case is the client and the persistent layer in the server) should open the session and receive the Session ID from the Persistent Layer 112. This unique number will be used during the whole session. There are three types of authorization: internal, LDAP and NT. In the internal authorization, to login to the Persistent Layer 112, the user must be registered and may not have an NT account. The LDAP is a lightweight directory access protocol. The NT authorization is performed by an operating system, but the user also should be registered in the Persistent Layer 112.

In the Persistent Layer 112, several persistent stores can be registered. Each persistent store has a unique ID, name, corresponding database (design of this database was described above), security type, information about accounts for other engines, logging options and event sinks information.

To register, edit registration or unregister, persistent store is used. To check the existing persistent stores, another powerful program persistent layer tool is used. Using the persistent layer tool application, a user is still able to register, edit or unregister persistent stores (PS), but also can login to any existent persistent stores and explore it. Class explorer shows information about classes (document types) hierarchy and existing properties.

Also available is information about associations, word lists, permission types, users and groups. The user is able to modify some types of data, for example, creating a new word list or modify an existing word list. Additional persistent layer tool features allow the user to generate *.bas visual basic source code, which contains declaration (constants) of classes ID, properties ID and association types ID, for example. It is also possible to check all currently logged in users (sessions information) and kill any session (similar to the task manager in the Windows).

The persistent layer architecture and available functionality is described below with respect to the following discussion on the server component. Discussion on the client framework describes how to use persistent layer functionality using the standard provided component. The persistent layer server component is a COM+ Application "qipl2", which should be registered on the application server. All clients call this application directly if they are on the same computer, or use the proxy if they are on the separate computer.

Figure 11:
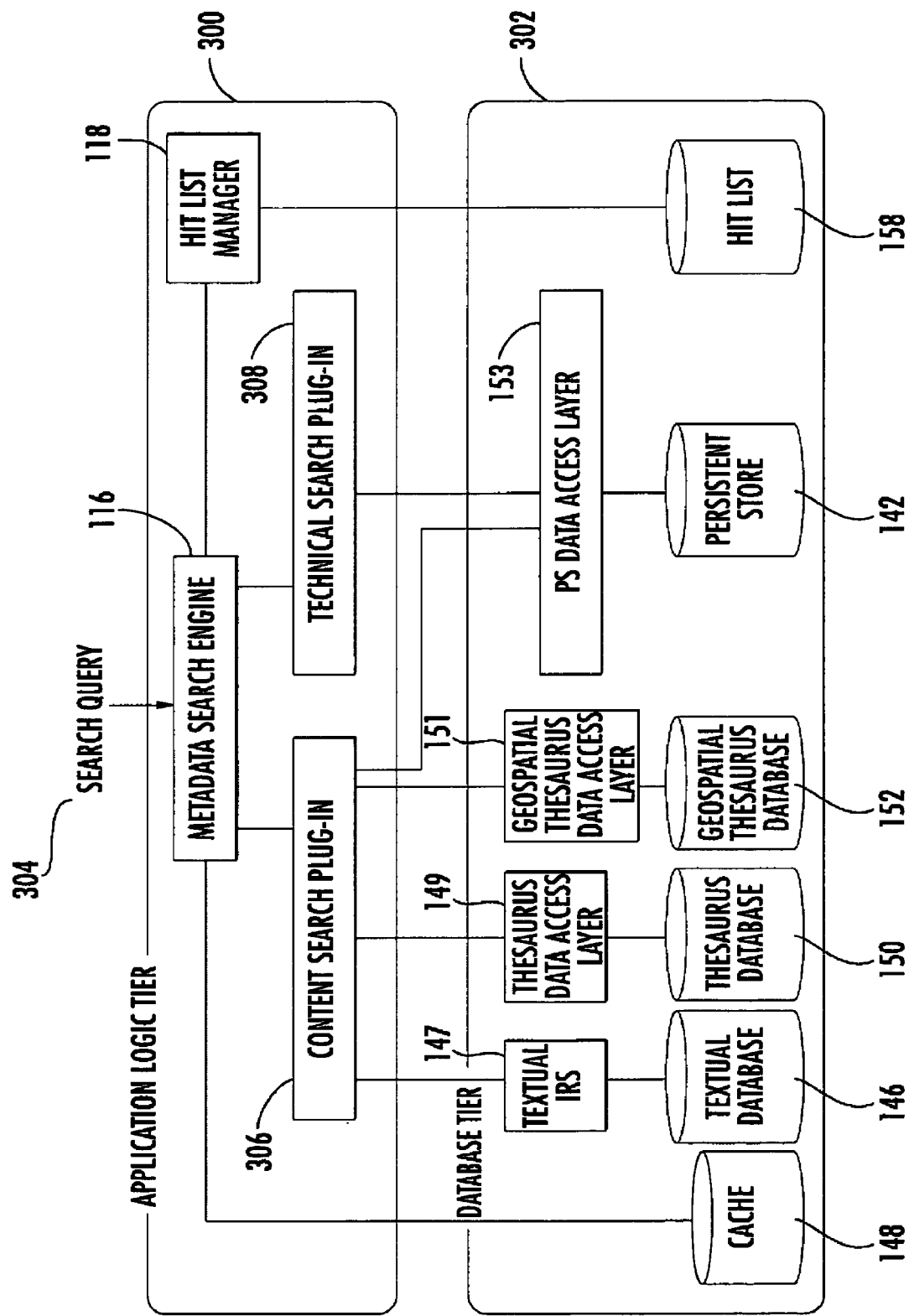
FIG. 11 is a block diagram illustrating the search engine and the I-Content components of the geospatially enabled media asset management system in accordance with the present invention.

Referring now to FIG. 11, the Metadata Search Engine 116 and the I-Content components comprise several parts. The Application Logic Tier 300 (COM+) implements and coordinates search functionality, and Database Tier 302 is used by the application components and subsystems. Administration utilities help the configuration of the search engine.

The Metadata Search Engine 116 is the coordinator of the search process. Search requests arrive via a Search Query 304 from the client side to this component in an XML format. The processing of searches is based on plug-ins. Two of the plug-ins include a Content Search Plug-in 306 and a Technical Search Plug-in 308. Searches are specified by three types of values: search operator modifiers and values, search operators specify the exact functionality of the search function, and modifiers broaden the search in various ways. The value is in the content of the search phrase.

For the Content Search Plug-in 306, full text search, thesaurus search, geospatial thesaurus search, word list and boolean search is performed by this plug-in. This requires access to the Textual Database 146 via the Textual IRS Layer 147, the Thesaurus Database 150 via the Thesaurus Data Access Layer 149, the Geospatial Thesaurus Database 152 via the Geospatial Thesaurus Data Access Layer 151, and the Persistent Store Database 142 via the Persistence Store Access Layer 153.

Full text search is done by the textual subsystem. The various search operators for a full text search along with the corresponding modifiers are provided in TABLES 1A and 1B.

TABLE 1A

| Search Operator | Function | Value |
|---|---|---|
| EQUAL | Search for words in text equal to the one in value. | Words specified according to search patterns. |
| DIFFERENT | Search for words in text not equal to the one in value. | |
| CONTAINS | Search for words in text containing the pattern specified in value (respects order, adjacency, the missing word operator(#) is supported). | |
| NCONTAINS | Search for words in text not containing the pattern specified in value (respects order, adjacency, the missing word operator(#) is supported). | |
| PHRASE_LIKE | Search for words in text containing the pattern specified in value (respect adjacency, the missing word operator(#) is not supported). | |
| NPHRASE_LIKE | Search for words in text not containing the pattern specified in value (respect adjacency, the missing word operator(#) is not supported). | |

TABLE 1B

| Modifier | Function |
|---|---|
| Modifier1: Stem | Find all words in text that are morphological variations of the stems of the words specified in the search phrase. |

TABLE 1B-continued

| Modifier | Function |
|---|---|
| Modifier2: Case | Uppercase and lowercase letters are considered in the search. |
| Modifier3: Typo | Typological variations of the words specified in the search phrase are also searched. |

A thesaurus search searches for documents that contain certain thesaurus terms derived from a search pattern by term expansion. Term expansion is a way to include several thesaurus terms in the search criteria, by finding terms that fit the search pattern. For example if the specified search pattern is "car*", then all the terms containing a word beginning with "car" are going to be searched for, such as car, car company and car wash. The various search operators for a thesaurus along with the corresponding modifiers are provided in TABLES 2A and 2B.

TABLE 2A

| Search Operator | Function | Value |
|---|---|---|
| ID_EQUAL | Search for a term with the term identifier specified in value. | A term identifier (unique). |
| ID_DIFFERENT | Search for all terms with a term identifier that is different from the one in value. | |
| EQUAL | Search for terms equal to the one in value. | A term, specified according to the search patterns. |
| DIFFERENT | Search for terms not equal to the one in value. | |
| CONTAINS | Search for terms containing the term specified in value. | |
| NCONTAINS | Search for terms not containing the term specified in value. | |

TABLE 2B

| Modifier | Function |
|---|---|
| Modifier1: Equivalence | Terms that are in an Equivalence relation with the searched terms are going to be found too. |
| Modifier2: Use For | Terms that are in a Use For association with the searched terms are going to be found too. |
| Modifier3: See Also | Terms that are in a See Also association with the searched terms are going to be found too. |

Word list search and expansion works the same way as thesaurus search and term expansion except that when expanding, word list elements are derived from the pattern, and then these word list elements are searched. The various search operators for a word list search along with the corresponding modifiers are provided in TABLES

TABLE 3A

| Search Operator | Function | Value |
|---|---|---|
| ID_EQUAL | Search for words with the identifier specified in value. | A word identifier (unique). |
| ID_DIFFERENT | Search for words with the identifier that is different from the one in value. | |
| EQUAL | Search for words equal to the one in value. | A word specified according to the search patterns. |
| DIFFERENT | Search for words not equal to the one in value. | |
| CONTAINS | Search for words containing the term specified in value. | |
| NCONTAINS | Search for words not containing the term specified in value. | |

TABLE 3B

| Modifier | Function |
|---|---|
| Modifier1: Equivalence | Words that are abbreviations of the searched words are going to be found too. |
| Modifier2: not used | — |
| Modifier3: not used | — |

The Technical Search Plug-in 308 is used for searching for simple data types in properties of documents. Simple data types are date, extended date, integer, float and time code. The Technical Search Plug-in 308 accesses the Persistent Store Database 142. The various search operators for a full text is provided in TABLE 4.

TABLE 4

| Search Operator | Function | Value |
|---|---|---|
| EQUAL | Search for dates equal to the date specified in value. | Date(s). (The # character can be used for missing elements.) |
| LESS | Search for dates before the date specified in value. | |
| LESSEQUAL | Search for dates equal to or before the date specified in value. | |
| DIFFERENT | Search for dates not equal to the date specified in value. | |
| GREATEREQUAL | Search for dates after the date specified in value. | |
| GREATER | Search for dates equal to or after the date specified in value. | |
| BETWEEN | Search for dates between the dates specified in value. | |

Figure 12:
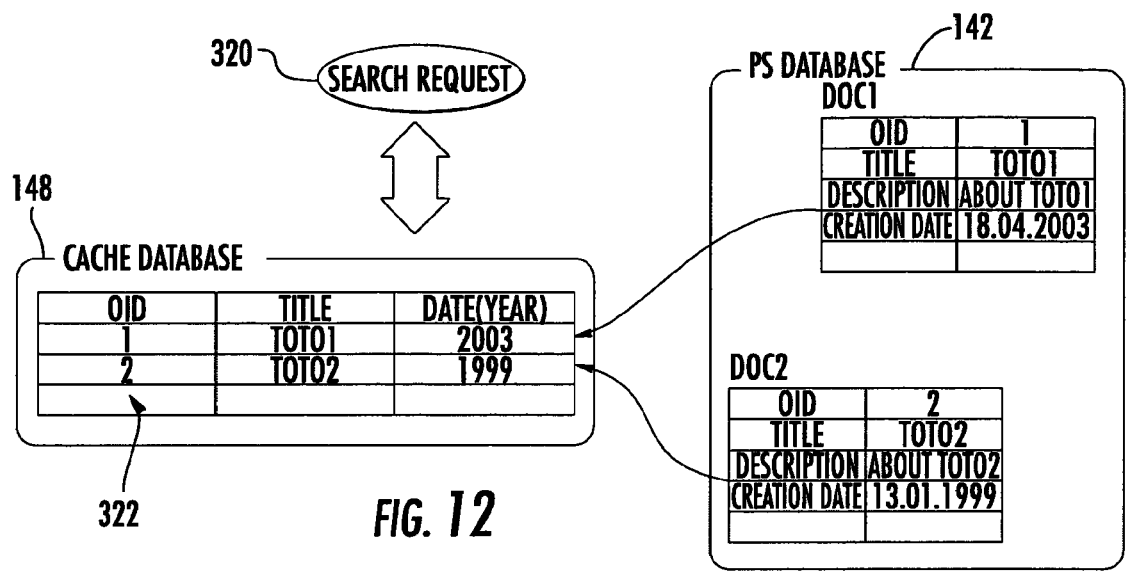
FIG. 12 is a block diagram illustrating object identifiers associated with the cache database in accordance with the present invention.

Caching is used to make information retrieval more efficient. Document properties are stored in the Cache Database 148 in a structure that reflects the structure of search schemes defined in the Metadata Manager 120 for document classes. Search requests are served using data found in the Cache Database 148. FIG. 12 illustrates this process. Based upon a Search Request 320, document objects are uniquely identified with Object Identifiers (OID) 322.

Figure 13:
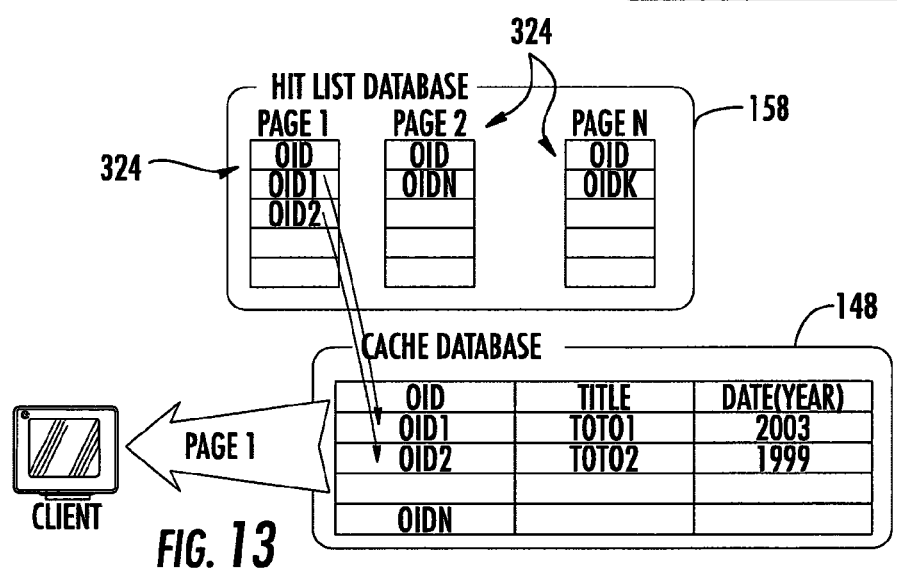
FIG. 13 is a block diagram illustrating the hit list database associated with the cache database in accordance with the present invention.

Hit List Manager 118 and Hit List Database 158 store Object Identifiers 324 of found documents of executed searches. Results of searches are passed to the client side in data units called pages. Out of all the search results, one page contains data of only a specified amount of documents. One page of documents has to be transferred to the client at a time, hence only a few of the search results have to be fully read from the database in case of a client request. Otherwise, storing only the object identifiers of found documents is sufficient to store search results on the server side. The purpose of the Hit List Database 158 is to store these object identifiers grouped into pages. One page contains the object identifiers of documents that are entirely read from the database at a time and sent to the client, as illustrated in FIG. 13.

The textual system is a full text search system that implements the basic full text search process, advanced features like stemming and typology check, and contains a Textual Database 146 for storing documents in a special format that allows for an efficient full text search process. The Textual IRS 147 is used as the full text search subsystem in the I-Content Metadata Search Engine 116.

Figure 14:
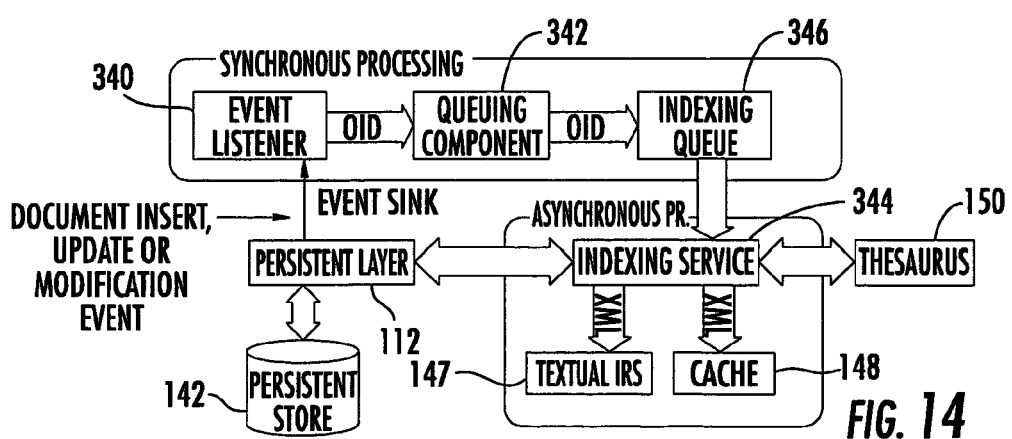
FIG. 14 is a block diagram illustrating the various components of the indexing process in accordance with the present invention.
Figure 17:
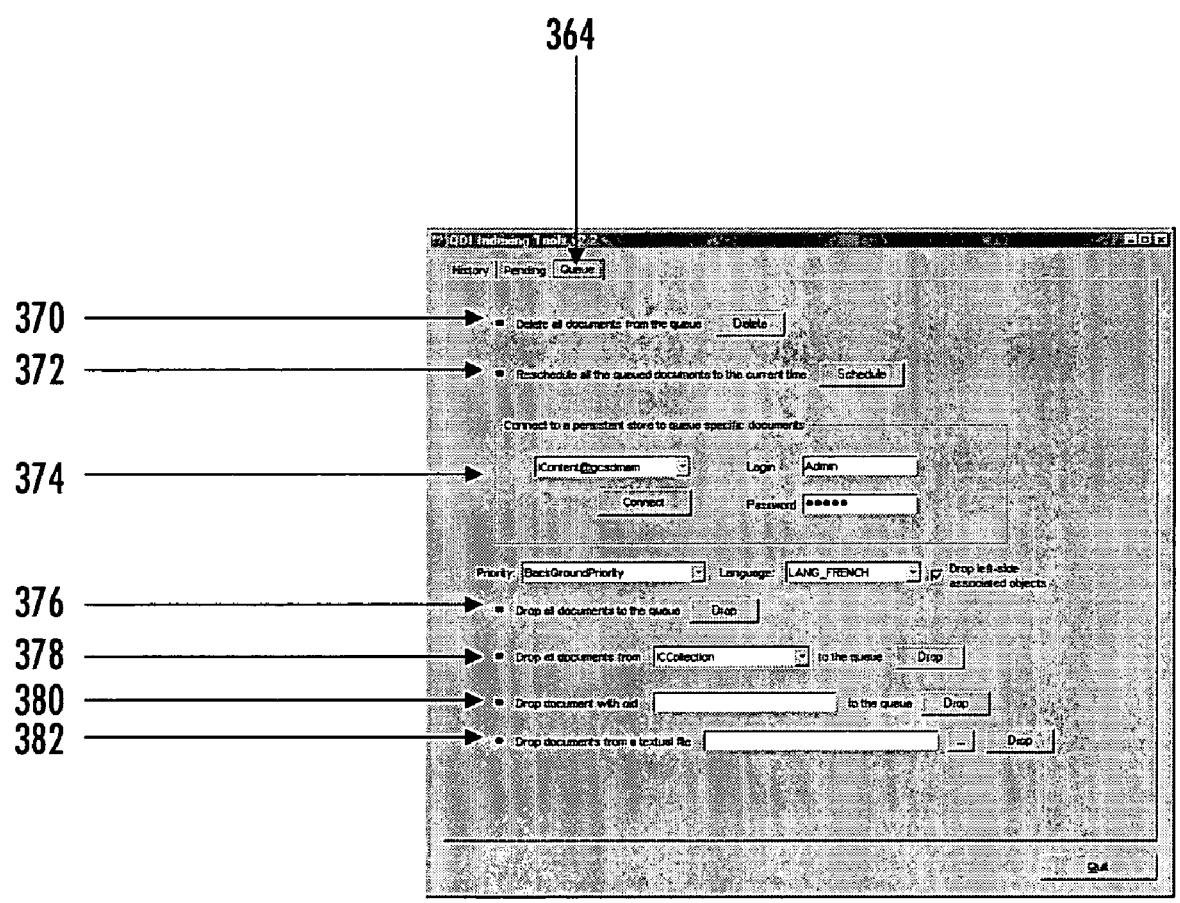

The system components which take part in the indexing process are illustrated in FIG. 14. Indexing takes place right after a new document is inserted into the system. During indexing, document data is inserted into the Textual IRS 147 and the Cache Database 148.

Document modification events are monitored by an Event Listener 340. Each time a document insert or update event takes place, a document object identifier (OID) is placed into an indexing queue from a Queuing Component 342. A Windows NT service (indexing service 344) keeps checking the Indexing Queue 346 asynchronously for newly inserted documents. When a new document is found, it passes the appropriate document data to the Textual IRS 147 and the Cache Database 148.

For performance reasons, a batch process is used to transfer document data into the textual IRS 147 and the Cache Database 148. The Indexing Service 344 takes several documents from the Indexing Queue 346 at a time. It places data files into a temporary folder, and when a certain amount of document data is collected, it passes data to the subsystems (Textual IRS 147, Cache Database 148).

Figure 15:
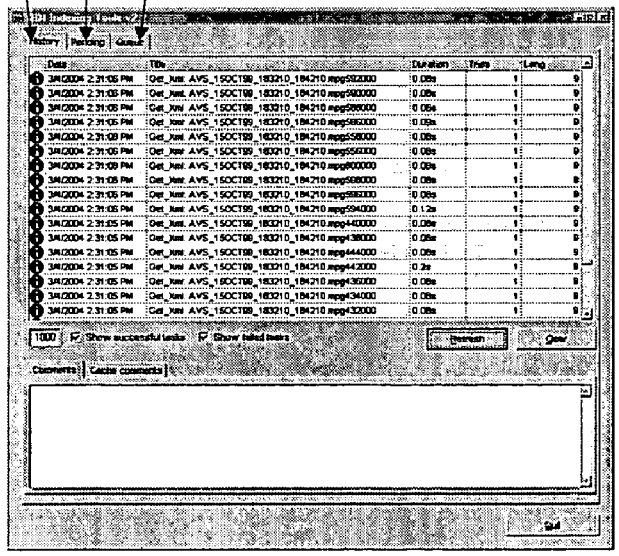

An indexing tool is a utility which can be used to monitor the Indexing Queue 346 and perform basic administration tasks. The user interface of the tool is divided into 3 main parts: History 360, Pending 362 and Queue 364 as illustrated in FIG. 15. In the History part 360, a list of processed (indexed) documents is provided. In the Pending part 362, the list of documents waiting to be indexed is provided.

The History part 360 is selected to list documents that have already been indexed. The number of most recently indexed documents to be displayed can be set. Only documents that have been successfully processed can be set to be displayed. The comment tabs are not used at the moment.

Figure 16:
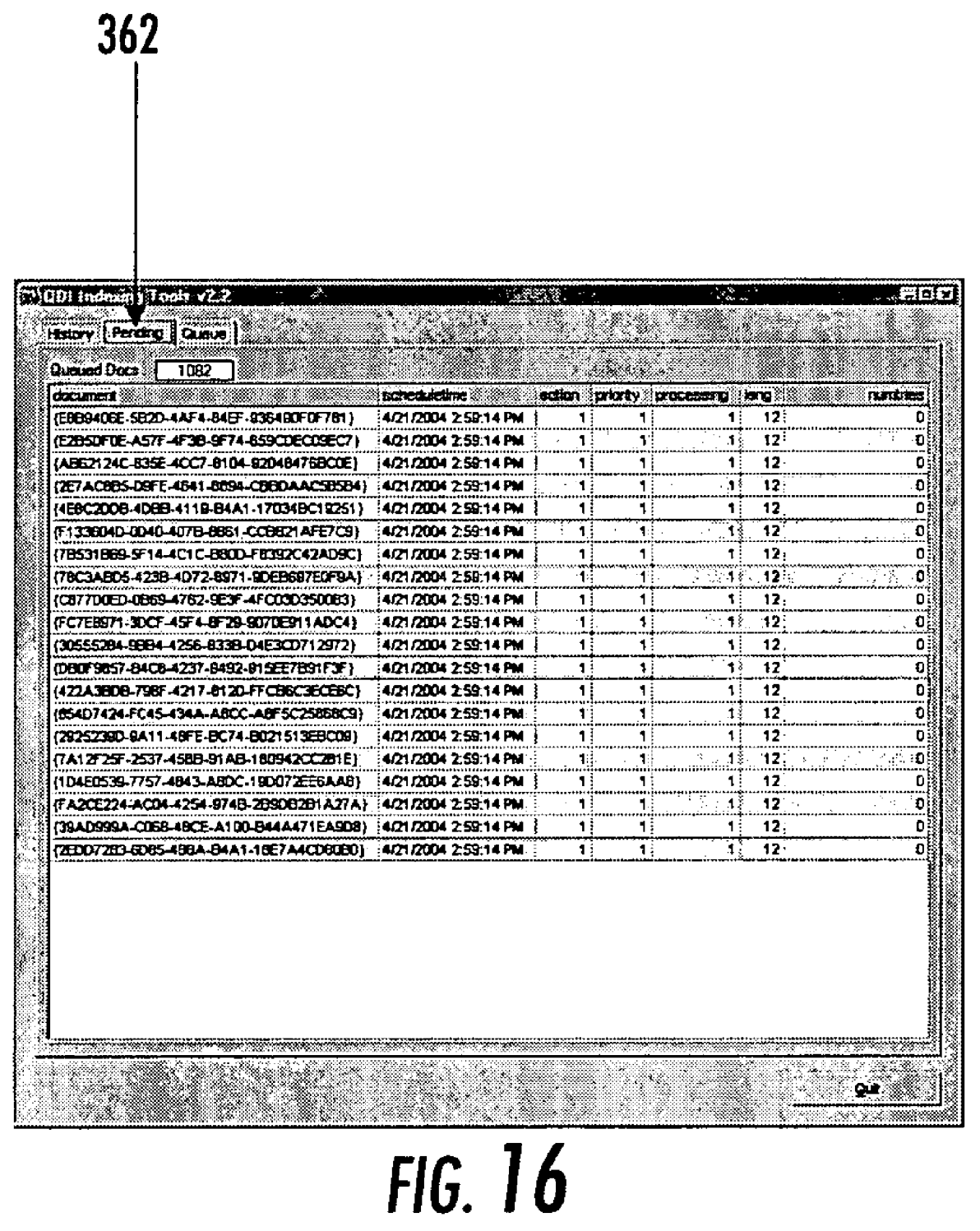

The Pending part 362 is selected to display documents that are currently in the Indexing Queue 346, as illustrated in FIG. 16. The following options are available in the Indexing Queue 364: delete all documents from the queue in field 370, reschedule all the queued documents to the current time in field 372, and connect to a Persistent Store in field 374.

When connected to the Persistent Store Database 142, certain documents can be dropped into the Indexing Queue 346. This forces the system 100 to reindex these documents. Reindexing is required, for example, when search schemes are modified. Options are also available for dropping.

Dropping all the documents from the Persistent Store Database 142 into the queue is provided in field 376. Dropping documents of a specific class in a Persistent Store into the Indexing Queue 346 is provided in field 378. Dropping of a document with a specified object identifier (OID) into the Indexing Queue 346 is provided in field 380. Dropping documents specified in a text file into the Indexing Queue 346 is provided in field 382. When dropping documents specified in a text file, the format should be the following when the file is a plain text file, and each line contains a concatenation of two GUID's: a class identifier and an object identifier. For example: {69CFA5A5-2B6F-4AF4-AAEF-81CB81007902}{7F9CE441-45BF-4403-8596-C2C53F27D2A8}

Configuration for the indexing process can be performed by editing an XML file. The contents of the entries in this XML file can be changed to alter the behavior of indexing. TABLE 5 lists the entries that may be modified:

TABLE 5

| Entry | Content |
| --- | --- |
| Login | Name of the Persistent Layer user account for indexing. |
| Password | Password for the PL indexing user account. |
| Pl_batch_size | The Indexing Service takes this number of documents from the Indexing Queue at a time. |
| irs_batch_size | Documents are inserted into the Textual IRS when this number of documents are collected. |
| max_tries | The maximum number of retries of indexing, if it was unsuccessful for a document. |
| Logfolder | The directory where logs of the indexing process are stored. |
| Documents pl_calls resultsets profiling | Specific logging functions can be turned on and off here. |

Figure 18:
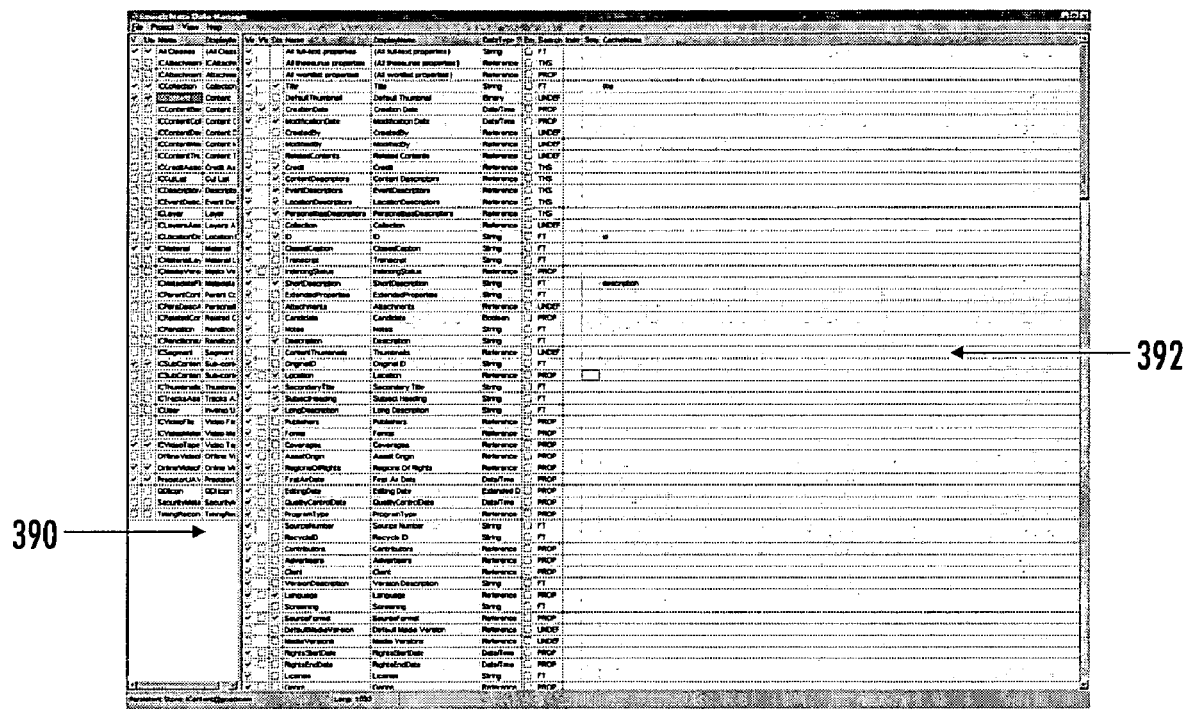
FIG. 18 is a display screen providing a metadata manager for configuring properties available for searching and properties for the cache database in accordance with the present invention.

The Metadata Manager 120 allows the user to configure properties available for searching and properties for the Cache Database 148, as illustrated by fields 390 and 392 in FIG. 18. The window is divided into a class list in field 390 on the left side, and into the class properties and options in field 392 on the right side.

Figure 19:
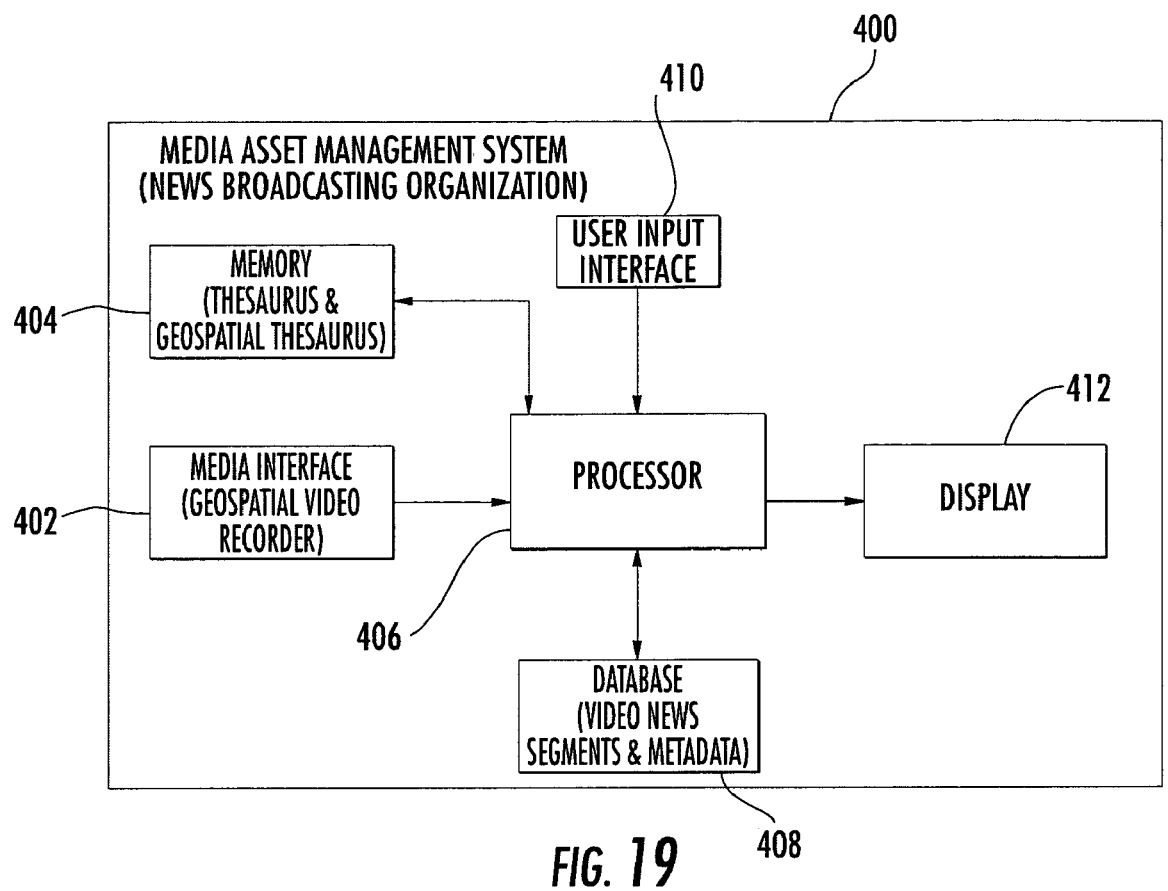
FIG. 19 is a block diagram of a media asset management system for a news broadcasting organization in accordance with the present invention.

In view of the above discussion, one aspect of the present invention is a media asset management system 400, such as for a news broadcasting organization, as illustrated in FIG. 19. In particular, the system 400 comprises a media interface 402 for collecting video news segments, with each video news segment having corresponding geospatial data associated therewith. The media interface 402 may interface with a geospatial video recorder, for example, as readily understood by those skilled in the art.

A memory 404 stores a search thesaurus comprising a plurality of search descriptors with cross-references therebetween. A processor 406 associates each video news segment with at least one respective descriptor from the search thesaurus. A database 408 stores each video news segment, its geospatial data and its at least one descriptor for later search and retrieval by the news broadcasting organization. Even though the memory 404 and the database 408 are shown as being separate, they may be packaged together.

For search and retrieval, a user input interface 410 permits a user to generate a user search query, wherein the user search query includes geospatial data. The processor 406 also compares the user search query with the thesaurus for identifying at least one additional search query, and for searching the video news segments based upon the user search query and the at least one additional search query. A display 412 displays at least one retrieved video news segment. The display 412 may display the at least one retrieved video news segment while also displaying a map corresponding to its geospatial data.

Figure 20:
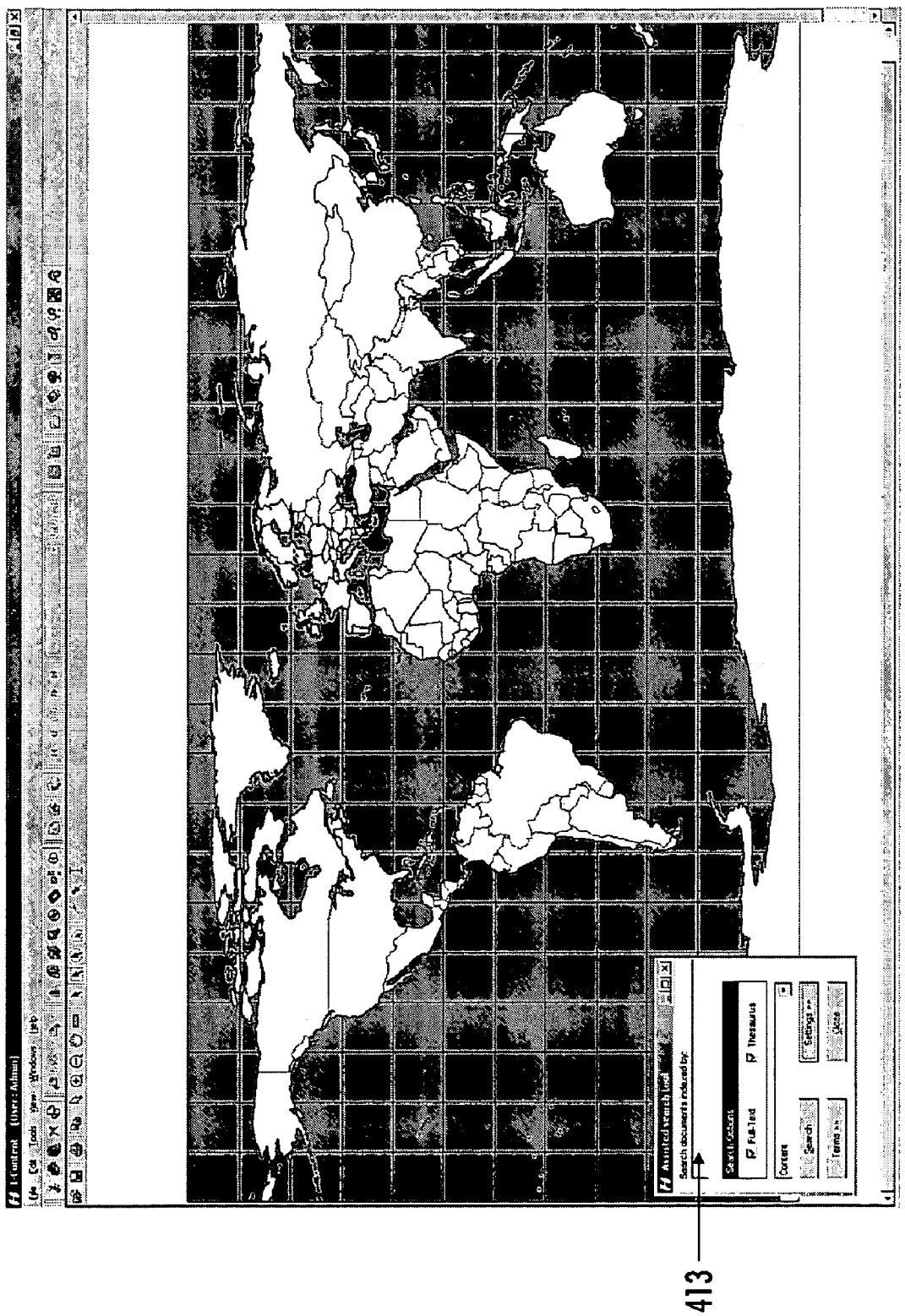
FIGS. 20-22 are map displays associated with a media asset management system for a news broadcasting organization in accordance with the present invention.
Figure 21:
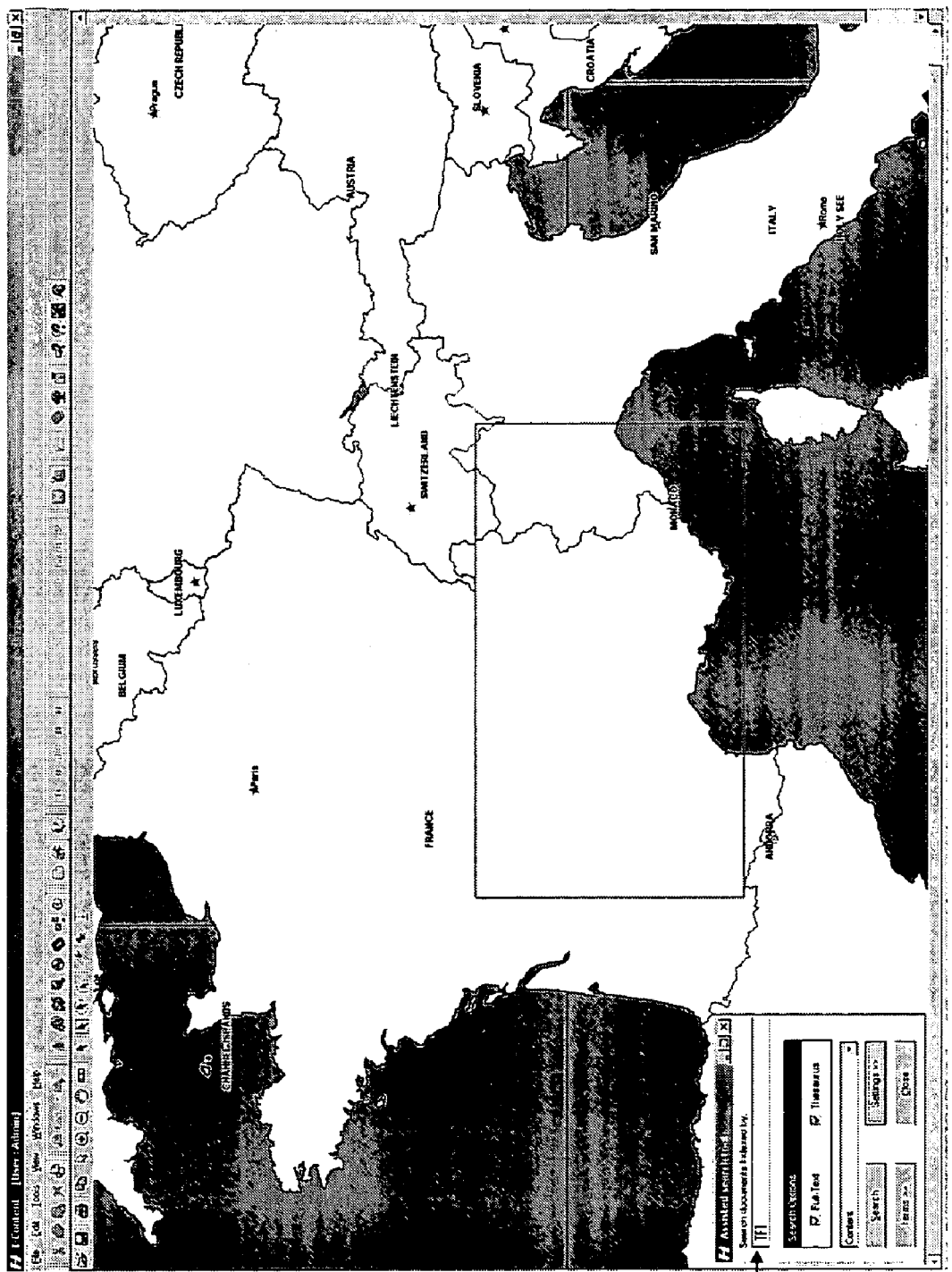
Figure 22:
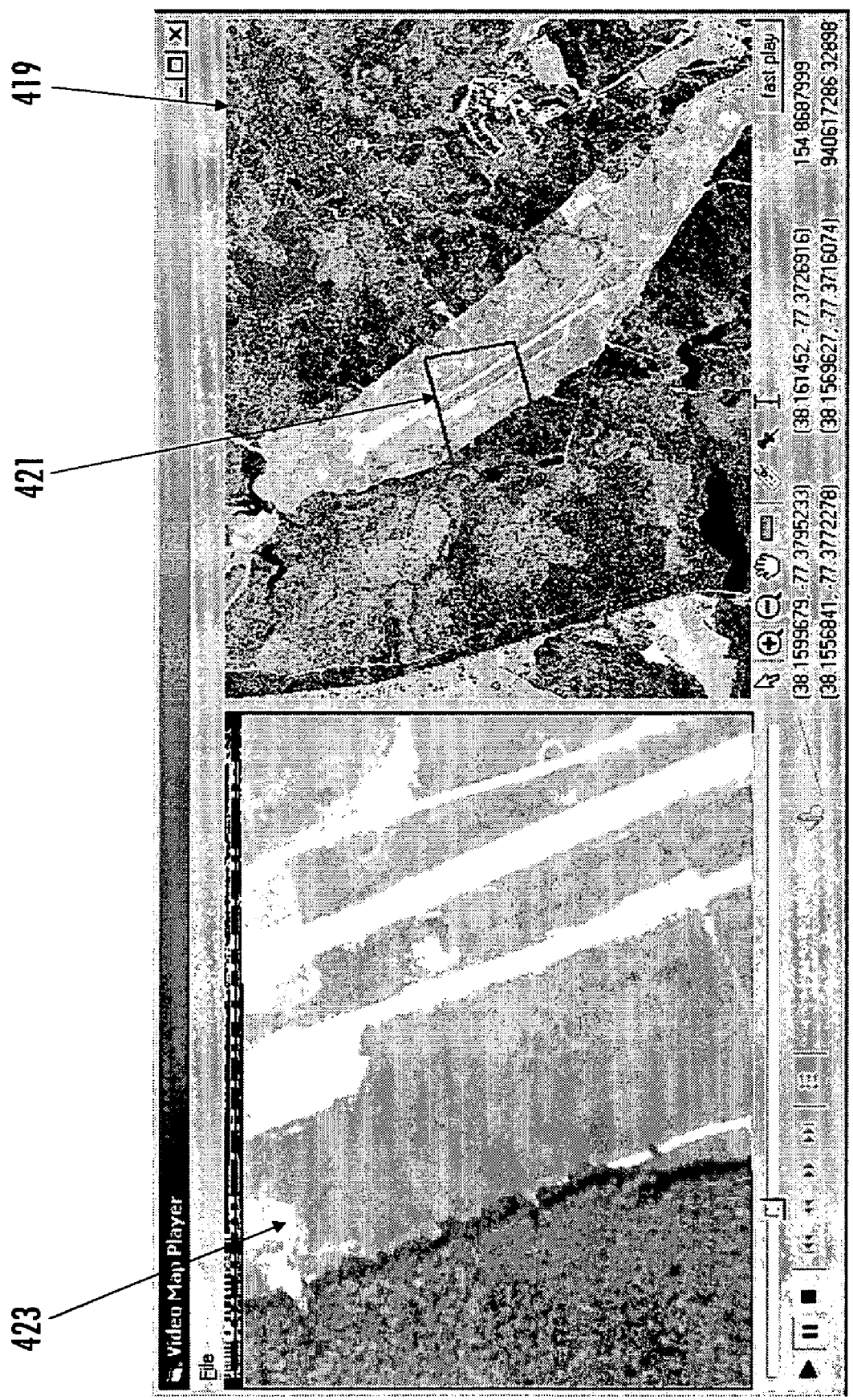

For instance, the display 412 may initially display a world map as shown in FIG. 20. Pop-up screen 413 permits the user to perform a full-text search or thesaurus search. A geospatial search query may then be used to select a region of interest 415 as shown in FIG. 21. Pop-up screen 417 permits the user to perform a more detailed full-text search or thesaurus search to a particular geographical area of interest. The display 412 may then display a split screen in which a map or overview of the geographical area is provided in field 419 as shown in FIG. 22. A specified region 421 of the overview may be further selected and the video news segments pertaining to this specified region are displayed in field 423.

Figure 23:
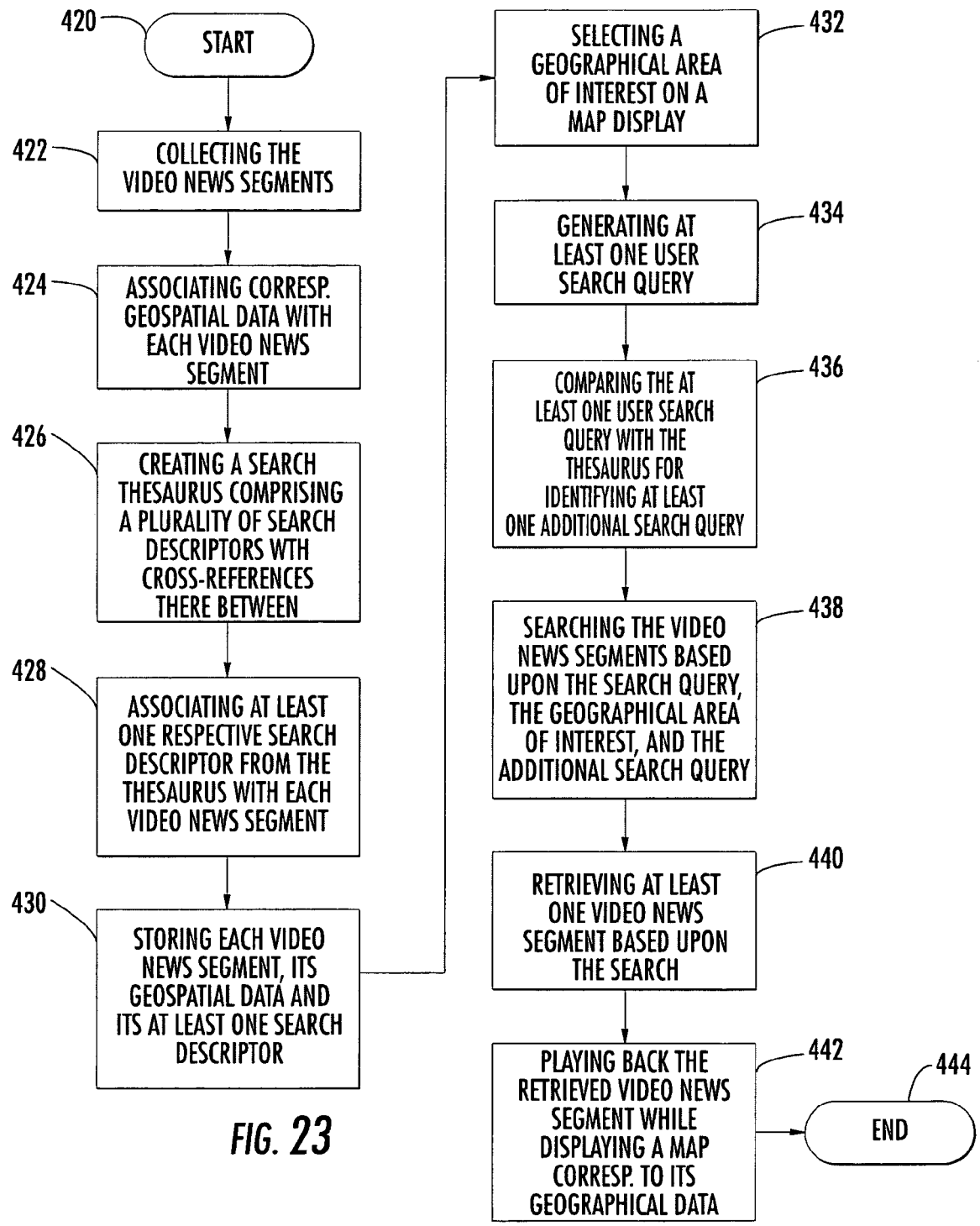
FIG. 23 is a flow chart illustrating a method for managing video news segments using the media asset management system illustrated in FIG. 19.

Referring now to FIG. 23, a method aspect for managing video news segments using the media asset management system 400 comprises, from the start (Block 420), collecting the video news segments at Block 422, associating corresponding geospatial data with each video news segment at Block 424, and creating a search thesaurus comprising a plurality of search descriptors with cross-references therebetween at Block 426. The method further comprises associating at least one respective search descriptor from the thesaurus with each video news segment at Block 428, and storing each video news segment, its geospatial data and its at least one search descriptor on the media asset management system 400 for later search and retrieval at Block 430.

For search and retrieval of the video news segments, the method further comprises selecting a geographical area of interest on a map display at Block 432, and generating at least one user search query at Block 434. The at least one user search query is compared with the thesaurus at Block 436 for identifying at least one additional search query. The video news segments are searched based upon the at least one user search query, the geographical area of interest, and the at least one additional search query at Block 438. At least one video news segment is retrieved based upon the search at Block 440. The at least one retrieved video news segment may be played back at Block 442 while displaying a map corresponding to its geographical data, as illustrated in FIG. 22, for example. The method ends at Block 444.

Figure 24:
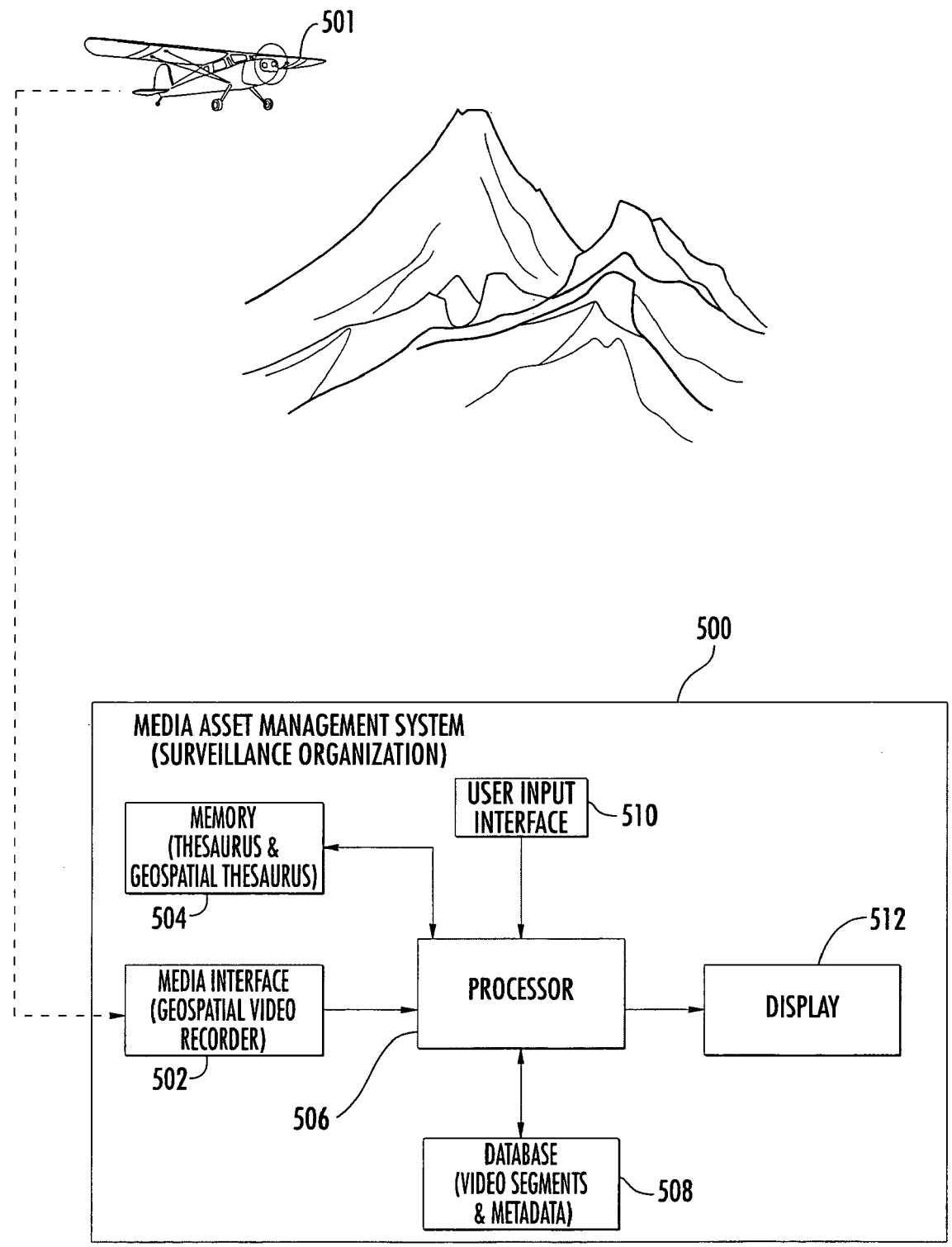
FIG. 24 is a block diagram of a media asset management system for managing video segments from an aerial sensor platform in accordance with the present invention.

Another aspect of the present invention is a media asset management system 500 for managing video segments from an aerial sensor platform 501, as illustrated in FIG. 24. The aerial sensor platform 501 may be an unmanned aerial vehicle, for example. Other types of sensor platforms are applicable, such as satellites, blimps, and even manned aircraft, as readily appreciated by those skilled in the art.

In the illustrated example, the aerial sensor platform 501 is monitoring a certain geographical area, which may be as large as 100 square miles, for example. Since the monitoring is typically done over an extended period of time, a large volume of temporal and location based media is being collected for the media asset management system 500 for later search and retrieval by a surveillance organization.

In particular, the system 500 comprises a media interface 502 for collecting the video segments from the aerial sensor platform 501, with each video segment having corresponding geospatial data associated therewith. The media interface 502 may interface with a geospatial video recorder, for example.

A memory 504 stores a search thesaurus comprising a plurality of search descriptors with cross-references therebetween. A processor 506 associates each video segment with at least one respective descriptor from the search thesaurus. A database 508 stores each video segment, its geospatial data and its at least one descriptor for later search and retrieval by the surveillance organization.

For search and retrieval, a user input interface 510 permits a user to generate a user search query, wherein the user search query includes geospatial data. As noted above, the geographical data corresponds to the specific locations and landmarks within the geographical area being monitored. The processor 506 also compares the user search query with the thesaurus for identifying at least one additional search query, and for searching the video segments based upon the user search query and the at least one additional search query. A display 512 displays at least one retrieved video segment.

Figure 25:
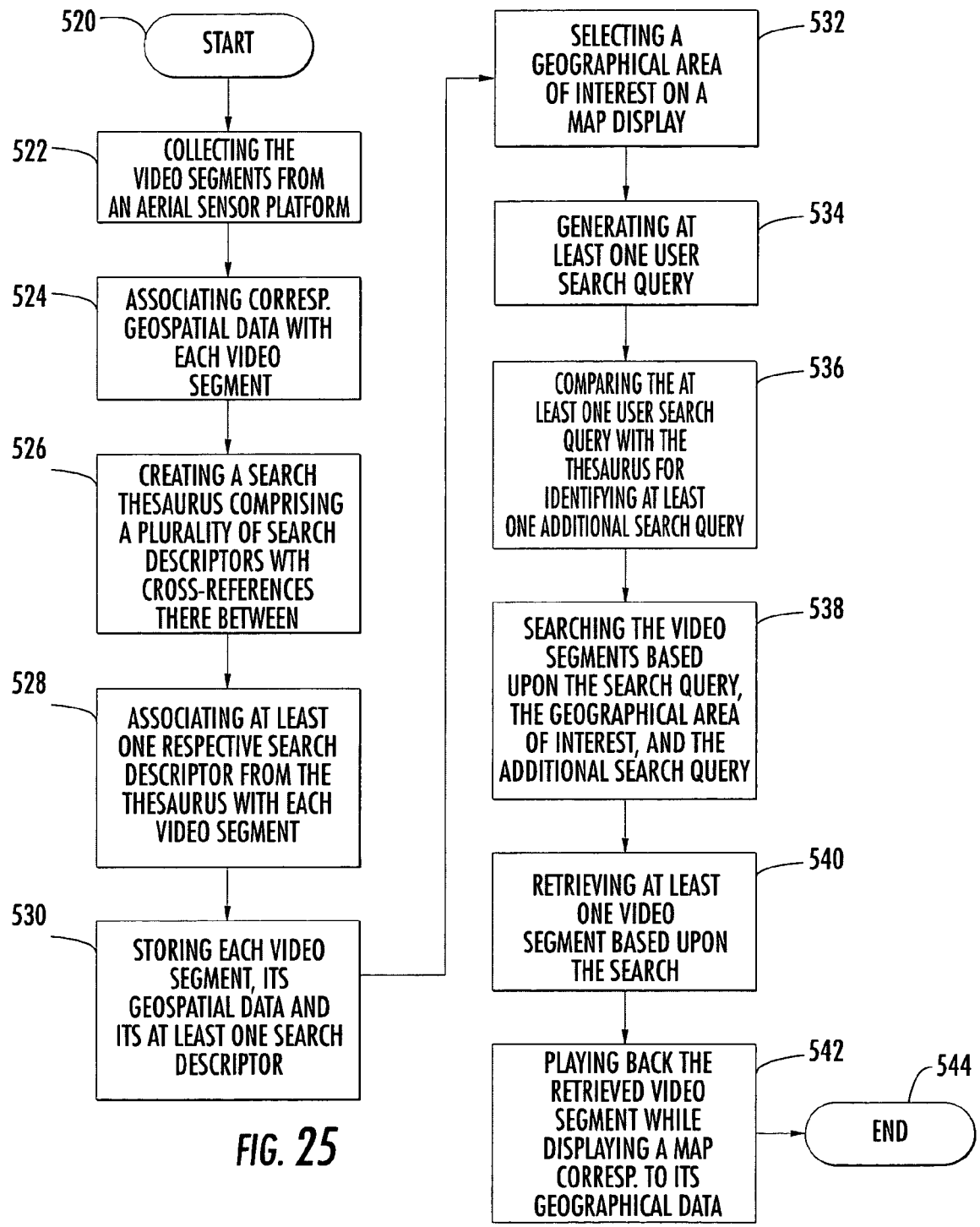
FIG. 25 is a flow chart illustrating a method for managing video segments from an aerial sensor platform using the media asset management system illustrated in FIG. 24.

Referring now to FIG. 25, a method aspect for managing video segments from an aerial sensor platform using the media asset management system 500 comprises, from the start (Block 520), collecting the video segments from the aerial sensor platform 501 at Block 522, associating corresponding geospatial data with each video segment at Block 524, and creating a search thesaurus comprising a plurality of search descriptors with cross-references therebetween at Block 526. The method further comprises associating at least one respective search descriptor from the thesaurus with each video segment at Block 528, and storing each video segment, its geospatial data and its at least one search descriptor on the media asset management system 500 for later search and retrieval by the surveillance organization at Block 530.

For search and retrieval of the video segments, the method further comprises selecting a geographical area of interest on a map display at Block 532, and generating at least one user search query at Block 534. The at least one user search query is compared with the thesaurus at Block 536 for identifying at least one additional search query. The video segments are searched based upon the at least one user search query, the geographical area of interest, and the at least one additional search query at Block 538. At least one video segment is retrieved based upon the search at Block 440. The at least one retrieved video segment may be played back at Block 542 while displaying a map corresponding to its geographical data, as illustrated in FIG. 22, for example. The method ends at Block 544.

Figure 26:
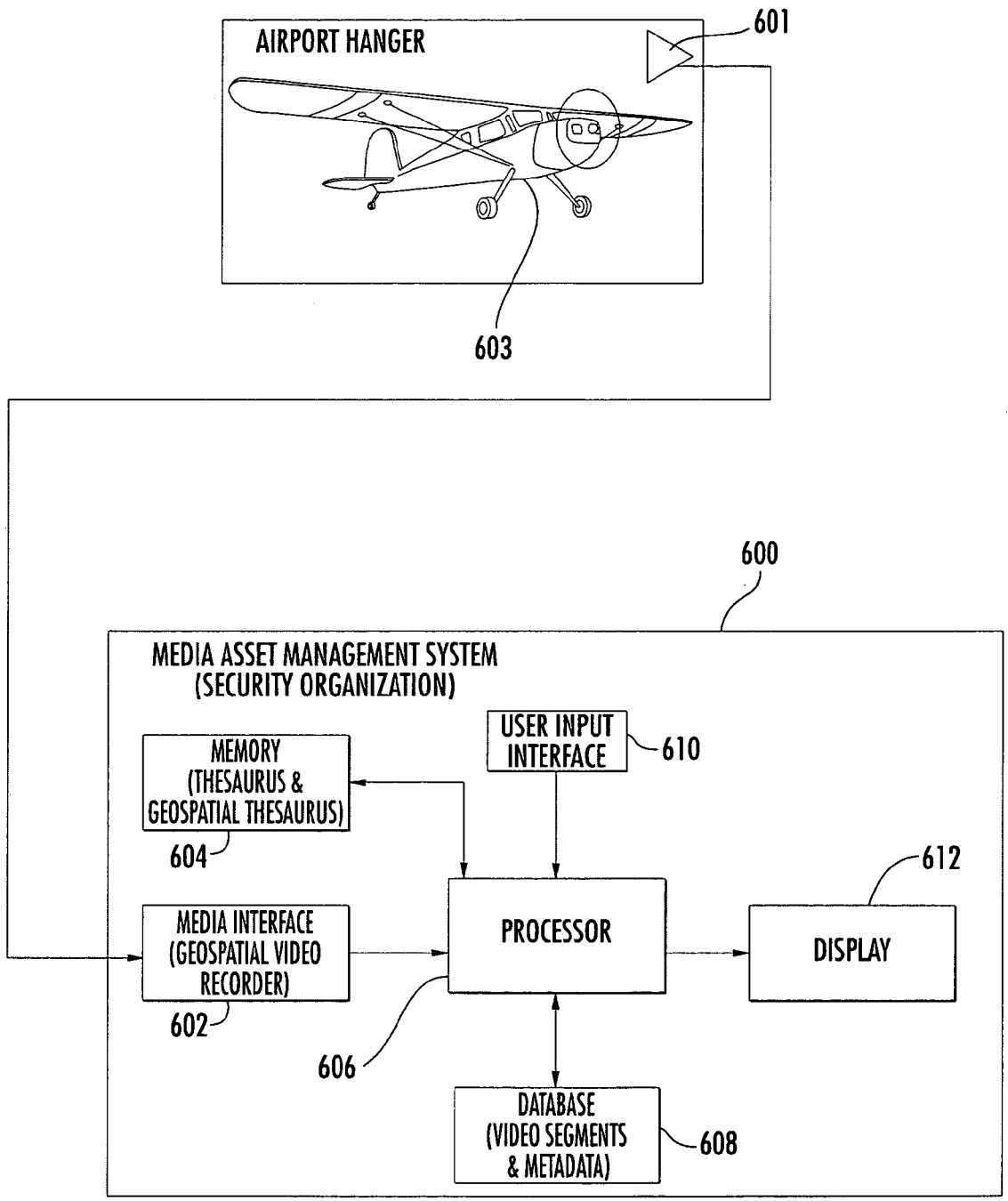
FIG. 26 is a block diagram of a media asset management system for managing fixed-area video segments from fixed-area security cameras in accordance with the present invention.

Yet another aspect of the present invention is a media asset management system 600 for managing video segments from security cameras 601, as illustrated in FIG. 26. Various security organizations have the responsibility of monitoring airports, shipping ports, and power and water utilities, for example. Security cameras 601 positioned throughout the areas to be monitored allow for continuous monitoring, with each camera providing surveillance on a particular area of interest.

In the illustrated example, the security cameras 601 are monitoring aircraft 603 parked at an airport. Since the monitoring is continuous, a large volume of temporal and location based media is being collected for the media asset management system 600 for later search and retrieval by a security organization. Each security camera 601 covers a fixed-area, and can pan, tilt and zoom on images within the fixed-area.

In particular, the system 600 comprises a media interface 602 for collecting the video segments from the security cameras 601, with each video segment having corresponding geospatial data associated therewith. The media interface 602 may interface with a geospatial video recorder, for example.

A memory 604 stores a search thesaurus comprising a plurality of search descriptors with cross-references therebetween. A processor 606 associates each video segment with at least one respective descriptor from the search thesaurus. A database 608 stores each video segment, its geospatial data and its at least one descriptor for later search and retrieval by the security organization.

For search and retrieval, a user input interface 610 permits a user to generate a user search query, wherein the user search query includes geospatial data. The geospatial data may include specific gate locations, aircraft hangers, and building entrances/exits, for example. The processor 606 also compares the user search query with the thesaurus for identifying at least one additional search query, and for searching the video segments based upon the user search query and the at least one additional search query. A display 612 displays at least one retrieved video segment.

Figure 27:
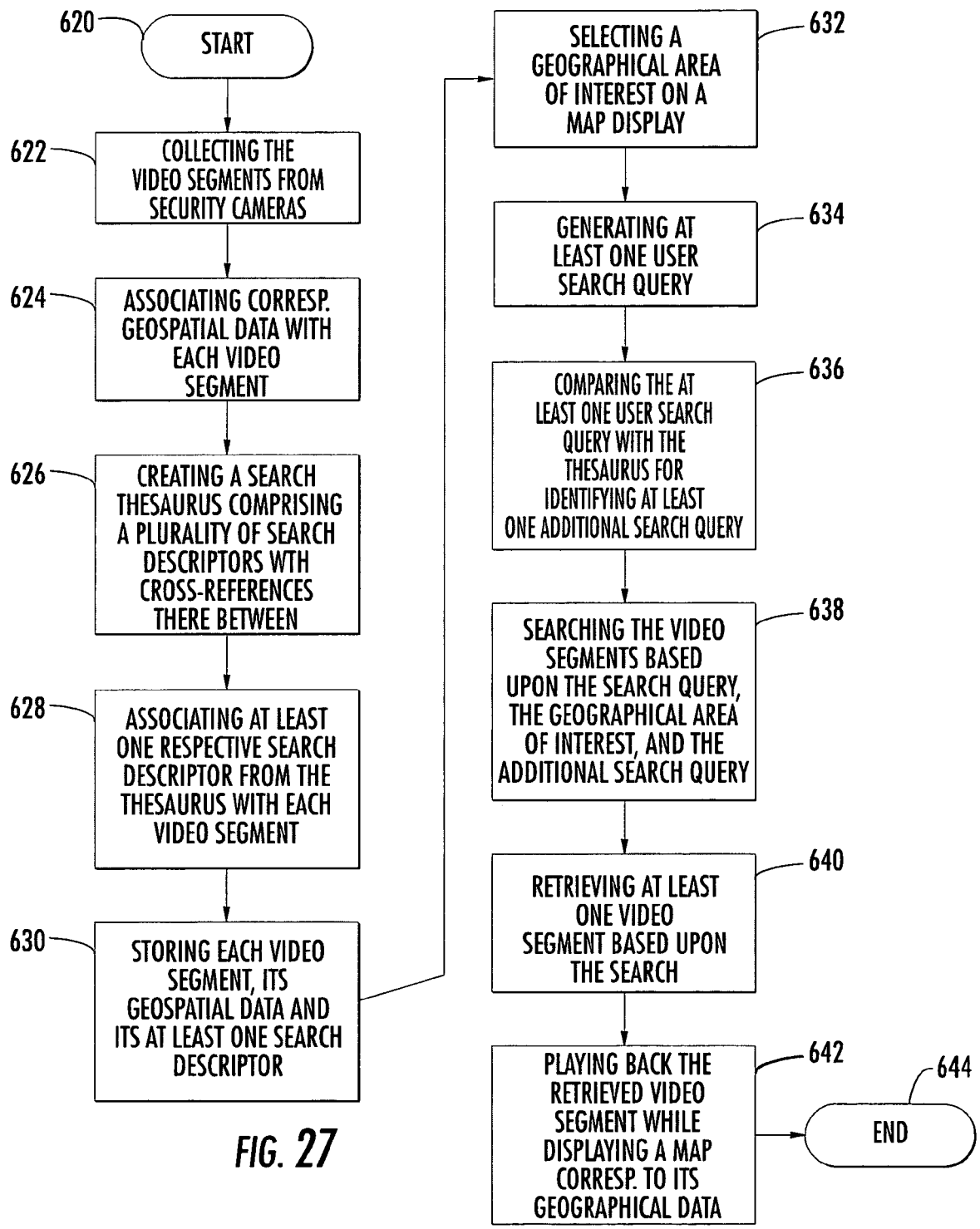
FIG. 27 is a flow chart illustrating a method for managing fixed-area video segments from fixed-area security cameras using the media asset management system illustrated in FIG. 26.

Referring now to FIG. 27, a method aspect for managing video segments from a plurality of security cameras 601 using the media asset management system 600 comprises, from the start (Block 620), collecting the video segments from the security cameras 601 at Block 622, associating corresponding geospatial data with each video segment at Block 624, and creating a search thesaurus comprising a plurality of search descriptors with cross-references therebetween at Block 626. The method further comprises associating at least one respective search descriptor from the thesaurus with each video segment at Block 628, and storing each video segment, its geospatial data and its at least one search descriptor on the media asset management system 600 for later search and retrieval at Block 630.

For search and retrieval of the video segments, the method further comprises selecting a geographical area of interest on a map display at Block 632, and generating at least one user search query at Block 634. As noted above, the geographical data may include a specific area of interest that is being monitored by one of the security cameras. The at least one user search query is compared with the thesaurus at Block 636 for identifying at least one additional search query. The video segments are searched based upon the at least one user search query, the geographical area of interest, and the at least one additional search query at Block 638. At least one video segment is retrieved based upon the search at Block 640. The at least one retrieved video segment may be played back at Block 642 while displaying a map corresponding to its geographical data, for example. The method ends at Block 644.

In addition, other features relating to the media asset management system are disclosed in copending patent applications filed concurrently herewith and assigned to the assignee of the present invention and are entitled MEDIA ASSET MANAGEMENT SYSTEM FOR MANAGING VIDEO NEWS SEGMENTS AND ASSOCIATED-METHODS, and MEDIA ASSET MANAGEMENT SYSTEM FOR MANAGING VIDEO SEGMENTS FROM AN AERIAL SENSOR PLATFORM AND ASSOCIATED METHODS, the entire disclosures of which are incorporated herein in their entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A method for managing fixed-area video segments from at least one fixed-area security camera using a media asset management system, the method comprising:
   collecting the fixed-area video segments from the at least one fixed-area security camera;
   associating corresponding geospatial data with each collected fixed-area video segment;
   creating, by the media asset management system, a search thesaurus comprising a plurality of search descriptors cross-referenced to one another, the search descriptors being linked together by a hierarchical relationship, an associative relationship and an equivalence relationship;
   the hierarchical relationship being defined by search descriptors comprising broader and narrower terms linked together, the associative relationship being defined by search descriptors comprising terms that are linked with similar or related terms where the relationship between the terms is non-hierarchical, and the equivalence relationship comprising synonyms;
   associating at least one respective search descriptor from the search thesaurus with each collected fixed-area video segment;
   storing the collected fixed-area video segments, associated geospatial data and associated search descriptors on the media asset management system;
   receiving at least one user search query, with the at least one user search query including geospatial data;
   comparing the at least one received user search query with the created search thesaurus for identifying at least one additional search query; and
   retrieving, by the media asset management system, at least one stored fixed-area video segment and at least one map, with the at least one retrieved fixed-area video segment corresponding to the at least one received user search query and the at least one identified additional search query, and with the at least one retrieved map corresponding to the associated geospatial data of the at least one retrieved fix-area video segment.

2. The method according to claim 1 wherein the collecting and associating are performed using a geospatial video recorder.

3. The method according to claim 1 wherein the geospatial data comprises latitude and longitude.

4. The method according to claim 1 further comprising associating content data with the fixed-area video segments.

5. The method according to claim 4 wherein the content data comprises a date and a time each fixed-area video segment was collected.

6. The method according to claim 4 wherein the content data comprises at least one of a topic, a location term, a landmark and an event.

7. The method according to claim 1 further comprising associating textual data with the fixed-area video segments.

8. The method according to claim 7 wherein associating textual data with the fixed-area video segments comprises transcribing audio from the fixed-area video segments into text.

9. The method according to claim 1 wherein the media asset management system is web based.

10. The method according to claim 1 wherein the fixed-area video segments are stored in both a low resolution mode and a high resolution mode.

11. The method according to claim 1 further comprising playing back the at least one retrieved fixed-area video segment while displaying the at least one retrieved map corresponding to its geospatial data.

12. The method according to claim 11 further comprising analyzing the at least one retrieved fixed-area video segment using a scene detection algorithm.

13. The method according to claim 1 further comprising:
selecting a geographical area of interest on a map display, with the at least one retrieved fixed-area video segment corresponding to the selected geographical area of interest.

14. A method for searching and retrieving fixed-area video segments from at least one fixed-area security camera stored on a media asset management system, the media asset management system also having stored thereon a search thesaurus comprising a plurality of search descriptors cross-referenced to one another, the search descriptors being linked together by a hierarchical relationship, an associative relationship and an equivalence relationship, and each fixed-area video segment having corresponding geospatial data associated therewith and also having at least one respective search descriptor from the search thesaurus associated therewith, the method comprising:
generating at least one user search query, the at least one user search query including geospatial data;
comparing, by the media asset management system, the at least one user search query with the search thesaurus for identifying at least one additional search query, the identifying being based on the plurality of search descriptors, with the hierarchical relationship being defined by search descriptors comprising broader and narrower terms linked together, the associative relationship being defined by search descriptors comprising terms that are linked with similar or related terms where the relationship between the terms is non-hierarchical, and the equivalence relationship comprising synonyms;
searching the stored fixed-area video segments based upon the at least one generated user search query and the at least one identified additional search query; and
retrieving, by the media asset management system, at least one fixed-area video segment and at least one map, with the at least one retrieved fixed-area video segment corresponding to the at least one generated user search query and the at least one identified additional search query, and with the at least one retrieved map corresponding to the associated geospatial data of the at least one retrieved fix-area video segment.

15. The method according to claim 14 wherein the geospatial data comprises latitude and longitude.

16. The method according to claim 14 wherein content data is associated with the fixed-area video segments.

17. The method according to claim 16 wherein the content data comprises a date and a time each fixed-area video segment was collected.

18. The method according to claim 16 wherein the content data comprises at least one of a topic, a location term, a landmark and an event.

19. The method according to claim 14 wherein textual data is associated with the fixed-area video segments, wherein the textual data is created by transcribing audio from the fixed-area video segments.

20. The method according to claim 14 wherein the fixed-area video segments are stored in both a low resolution mode and a high resolution mode.

21. The method according to claim 14 wherein the media asset management system is web based.

22. The method according to claim 14 further comprising playing back the at least one retrieved fixed-area video segment while displaying the at least one retrieved map corresponding to its geospatial data.

23. The method according to claim 22 further comprising analyzing the at least one retrieved fixed-area video segment using a scene detection algorithm.

24. The method according to claim 14 further comprising selecting a geographical area of interest on a map display; and wherein searching the fixed-area video segments is also based upon the geographical area of interest.

25. A media asset management system for fixed-area video segments from at least one fixed-area security camera comprising:
a media interface for collecting fixed-area video segments from the at least one fixed-area security camera, each fixed-area video segment having corresponding geospatial data associated therewith;
a memory for storing a search thesaurus comprising a plurality of search descriptors cross-referenced to one another, the search descriptors being linked together by a hierarchical relationship, an associative relationship and an equivalence relationship, with the hierarchical relationship being defined by search descriptors comprising broader and narrower terms linked together, with the associative relationship being defined by search descriptors comprising terms that are linked with similar or related terms where the relationship between the terms is non-hierarchical, and with the equivalence relationship comprising synonyms;
a processor for associating each fixed-area video segment with at least one respective search descriptor from the search thesaurus; and
a database for storing the collected fixed-area video segments, geospatial data and associated search descriptors;
said processor further configured for
receiving at least one user search query, the at least one user search query including geospatial data,
comparing the at least one received user search query with the search thesaurus for identifying at least one additional search query, and
retrieving at least one stored fixed-area video segment and at least one map, with the at least one retrieved fixed-area video segment corresponding to the at least one received user search query and the at least one identified additional search query, and with the at least one retrieved map corresponding to the associated geospatial data of the at least one retrieved fix-area video segment.

26. The media asset management system according to claim 25 wherein the geospatial data comprises latitude and longitude.

27. The media asset management system according to claim 25 further comprising a user input interface for permitting a user to input content data; and
wherein said processor associates the content data with the fixed-area video segments.

28. The media asset management system according to claim 27 wherein the content data comprises a date and a time each fixed-area video segment was collected.

29. The media asset management system according to claim 27 wherein the content data comprises at least one of a topic, a location term, a landmark and an event.

30. The media asset management system according to claim 25 wherein said processor associates textual data with the fixed-area video segments by transcribing audio from the fixed-area video segments into text.

31. The media asset management system according to claim 25 wherein each fixed-area video segment is stored in both a low resolution mode and a high resolution mode.

32. The media asset management system according to claim 25 wherein the media asset management system is web based.

33. The media asset management system according to claim 25 further comprising a user input interface for permitting a user to generate at least one user search query; wherein said processor:
   searches said database based upon the at least one user search query and the at least one identified additional search query for retrieving at least one fixed-area video segment.

34. The media asset management system according to claim 33 further comprising a display for playing back the at least one retrieved fixed-area video segment while displaying the at least one retrieved map corresponding to its geospatial data.

35. The media asset management system according to claim 34 wherein said processor monitors the at least one retrieved fixed-area video segment using a scene detection algorithm.

36. The media asset management system according to claim 25 further comprising:
   a map display;
   a user input interface for permitting a user to select a geographical area of interest on said map display; and
   said processor searching the fixed-area video segments based upon the at least one received user search query, and the at least one identified additional search query and the selected geographical area of interest.

37. A media asset management system for fixed-area video segments from at least one fixed-area security camera comprising:
   a memory for storing a search thesaurus comprising a plurality of search descriptors cross-referenced to one another, the search descriptors being linked together by a hierarchical relationship, an associative relationship and an equivalence relationship;
   a database for storing fixed-area video segments from at least one fixed-area security camera, each fixed-area video segment having corresponding geospatial data associated therewith and also having at least one search descriptor from the search thesaurus associated therewith;
   a user input interface for permitting a user to generate at least one user search query, the at least one user search query including geospatial data;
   a processor for comparing the at least one generated user search query with the search thesaurus for
      identifying at least one additional search query based on the search descriptors being linked together by the hierarchical relationship, the associative relationship and the equivalence relationship, with the hierarchical relationship being defined by search descriptors comprising broader and narrower terms linked together, with the associative relationship being defined by search descriptors comprising terms that are linked with similar or related terms where the relationship between the terms is non-hierarchical, and with the equivalence relationship comprising synonyms,
      searching the fixed-area video segments based upon the at least one user search query and the at least one additional search query, and
      retrieving at least one stored fixed-area video segment and at least one map, with the at least one retrieved fixed-area video segment corresponding to the at least one generated user search query and the at least one identified additional search query, and with the at least one retrieved map corresponding to the associated geospatial data of the at least one retrieved fix-area video segment; and
   a display for displaying the at least one retrieved fixed-area video segment and the at least one retrieved map.

38. The media asset management system according to claim 37 wherein the geospatial data comprises latitude and longitude.

39. The media asset management system according to claim 37 wherein said user input interface also permits the user to generate content data.

40. The media asset management system according to claim 39 wherein the content data comprises a date and a time each fixed-area video segment was collected.

41. The media asset management system according to claim 39 wherein the content data comprises at least one of a topic, a location term, a landmark and an event.

42. The media asset management system according to claim 37 wherein textual data is associated with the fixed-area video segments.

43. The media asset management system according to claim 42 wherein the textual data comprises transcribed audio from the fixed-area video segments.

44. The media asset management system according to claim 37 wherein the fixed-area video segments are stored in said database in both a low resolution mode and a high resolution mode.

45. The media asset management system according to claim 37 wherein the media asset management system is web based.

46. The media asset management system according to claim 37 wherein said display displays the at least one retrieved fixed-area video segment while also displaying the at least one retrieved map corresponding to its geospatial data.

47. The media asset management system according to claim 46 wherein said processor analyzes the at least one retrieved fixed-area video segment using a scene detection algorithm.

48. The media asset management system according to claim 37 wherein said display comprises a map display; and wherein said user input interface also permits the user to select a geographical area of interest on said map display; and wherein said processor searches the database based upon the at least one generated user search query, the at least one identified additional search query and the selected geographical area of interest.

* * * * *